United States Patent
Eleti et al.

(10) Patent No.: US 12,554,519 B2
(45) Date of Patent: Feb. 17, 2026

(54) VIRTUAL ASSISTANTS API

(71) Applicant: OpenAI OpCo, LLC., San Francisco, CA (US)

(72) Inventors: Athyuttam Eleti, San Francisco, CA (US); Michal Pokrass, San Francisco, CA (US)

(73) Assignee: OpenAI OpCo, LLC., San Francisco, CA (US)

( * ) Notice: Subject to any disclaimer, the term of this patent is extended or adjusted under 35 U.S.C. 154(b) by 0 days.

(21) Appl. No.: 19/047,982

(22) Filed: Feb. 7, 2025

(65) Prior Publication Data
US 2025/0278288 A1    Sep. 4, 2025

Related U.S. Application Data

(60) Provisional application No. 63/558,460, filed on Feb. 27, 2024.

(51) Int. Cl.
| | |
|---|---|
| *G06F 40/40* | (2020.01) |
| *G06F 9/451* | (2018.01) |
| *G06F 9/50* | (2006.01) |
| *G06F 9/54* | (2006.01) |
| *G06N 20/00* | (2019.01) |
| *G10L 15/22* | (2006.01) |

(52) U.S. Cl.
CPC ............ *G06F 9/5027* (2013.01); *G06F 9/453* (2018.02); *G06F 9/546* (2013.01); *G06F 40/40* (2020.01); *G06N 20/00* (2019.01); *G06F 2209/541* (2013.01)

(58) Field of Classification Search
CPC ...................................................... G10L 15/22
See application file for complete search history.

(56) References Cited

U.S. PATENT DOCUMENTS

| | | | | |
|---|---|---|---|---|
| 2020/0327196 | A1* | 10/2020 | Sampat | G06N 20/00 |
| 2022/0239610 | A1* | 7/2022 | Lalji | G06N 20/00 |
| 2024/0394502 | A1* | 11/2024 | Sami | G06N 3/006 |
| 2024/0428043 | A1* | 12/2024 | Chiu | G06N 3/006 |

OTHER PUBLICATIONS

Lucy Keer, "Create a custom chatbot with TalkJS and the OpenAI API", [online] https://talkjs.com, published on Jan. 15, 2024. (Year: 2024).*

Zein Ismalingga, "Beginner's Guide to Using OpenAI's Assistant API", [online] https://medium.com, published on Mar. 15, 2024 (Year: 2024).*

(Continued)

*Primary Examiner* — Jialong He
(74) *Attorney, Agent, or Firm* — Polsinelli PC

(57) ABSTRACT

The present technology pertains to providing, configuring and operating of a virtual assistant that can be accessible via an application programming interface. The virtual assistant can be configured with a customized system message, and can have access to a conversation thread of undefined length, whereby the virtual assistant can both be specialized for a given task and can have an ability to recall past interactions, thus mimicking the skill and memory of a human assistant. The present technology provides for a first entity to configure the virtual assistant and to call the virtual assistant by referencing its assistant ID.

20 Claims, 11 Drawing Sheets

(56) References Cited

OTHER PUBLICATIONS

Ivan Campos, "GPT-4 API Reference Guide", [online] https://medium.com; published on Mar. 21, 2023 (Year: 2023).*
Baku, "OpenAI—streaming", [online] https://github.com/AlmogBaku/openai-streaming; published on May 22, 2024. (Year: 2024).*
DatScy, [online] https://medium.com/@j622amilah/openai-assistant-rest-api-usage-7a8ccd000c28;, May 8, 2024. (Year: 2024).*
"An API / dashboard to create an "agent"; similar in spirit to Assistants; founder seems to have pivoted to a different idea"; https://github.com/superagent-ai/superagent.
"A community effort to standardize an API to define agents; never quite took off"; https://github.com/Div99/agent-protocol.
Superagent-ai/superagent; https://docs.superagent.sh.
Div99/agent-protocol; https://agentprotocol.ai.
OpenAi API Reference Assistants; dated: Nov. 8, 2023; https://platform.openai.com/docs/api-reference/assistants/object, 77 pages.

\* cited by examiner

VIRTUAL ASSISTANTS API

CROSS-REFERENCE TO RELATED APPLICATIONS

This application claims priority to U.S. provisional application No. 63/558,460, filed on Feb. 27, 2024, and titled "SYSTEMS AND METHODS FOR GENERATING AND EXECUTING FUNCTION CALLS USING MACHINE LEARNING, which is expressly incorporated by reference herein in its entirety.

BACKGROUND

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. Generative response engines can sift through vast amounts of text data, extract context, and provide coherent responses to a wide array of queries.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

DETAILED DESCRIPTION

Figure 1:
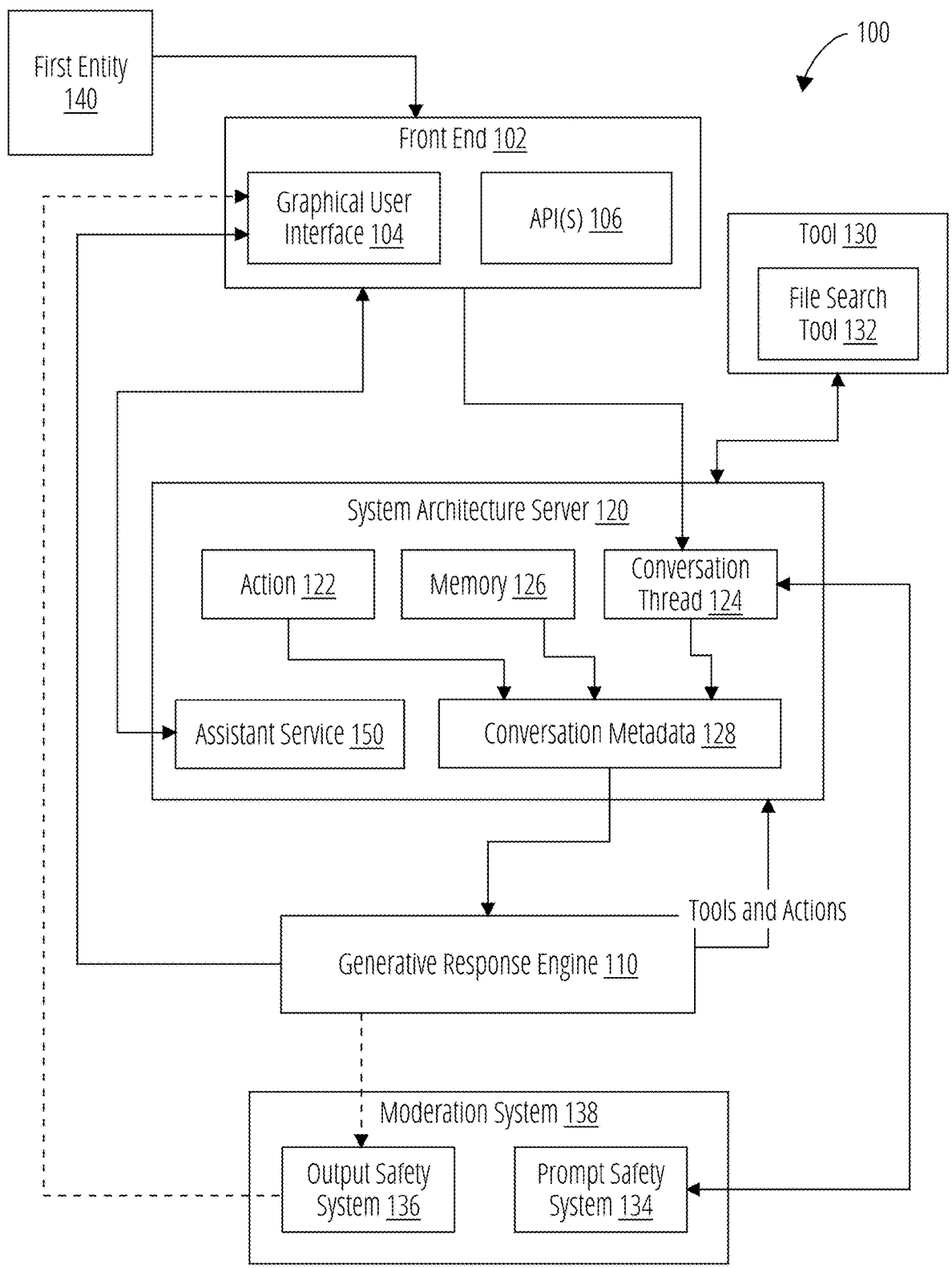
FIG. 1 illustrates an example system supporting a generative response engine during inference operations in accordance with some embodiments of the present technology.

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, code generation, image, audio, and video generation. Given the impressive capabilities of generative response engines, there is a desire to improve generative response engines to act more like a skilled assistant. This desire is true for both user accounts interacting directly with the generative response engine and related user interface, or for application developers that want their applications to make use of generative response engines to provide assistant-like capabilities.

However, generative response engines are generally suited to generic tasks. Meanwhile, an assistant probably has some knowledge of the task they are to perform. At least the assistant would receive instructions about the tasks, and over time; the assistant would gain experience in performing that task multiple times and would become better at performing the task. Accordingly, there is a need to provide generative response engines that have more characteristics of a skilled assistant.

The present technology addresses these deficiencies to enable a generative response engine to be a more capable virtual assistant.

A first entity can be a human user, an application, or an organization with human users and applications, that configure and use a persistent virtual assistant. For example, a first entity might include a human developer that configures the virtual assistant, while an application that is part of the first entity calls the virtual assistant once it is configured. Both the human user and the application would be considered the first entity in the above example. In another example, the first entity can be one or more human users of an organization, where one or more human users configure and then use the configured virtual assistant. In another example, the first entity can be one or more applications or application instances that configure and then use the configured virtual assistant. It is not required that all human users or applications are part of the same organization to be the same first entity. Though, any human user or application should have valid privileges to modify or use the virtual assistant. In some instances, valid privileges mean that the first entity has access to an API token or user account that has privileges to communicate with the virtual assistant. In some instances, valid privileges mean that the first entity is the creator of the virtual assistant or the virtual assistant has been shared and associated with the first entity's API token or user account.

The virtual assistant can be given an assistant ID to invoke it or modify it. The virtual assistant can be given instructions to perform a task that will also persist with the virtual assistant. Thus, there is no need to repeatedly give the virtual assistant the same instructions; the virtual assistant will already know its instructions once it is configured.

Additionally, the virtual assistant can be given access to its context from past interactions. Therefore, the virtual assistant can 'remember' aspects of its past task performance. The virtual assistant can remember past feedback and past messages communicated to and from the virtual assistant.

Additionally, the virtual assistant can be given access to a knowledge base of documents. Often projects might involve working with a collection of documents, and the present technology can provide these documents to the virtual assistant to improve the range of tasks that the virtual assistant might be able to perform. In some embodiments, the present technology can receive a collection of documents via an API and automatically create an index to make the documents in the collection usable to a virtual assistant. In some embodiments, the present technology can enable a first entity to provide a prompt and a collection of documents to be analyzed in preparing a response to the prompt, and the present technology can automatically handle an end-to-end process of indexing the documents in the collection to make them searchable, and can then generate the response based on the indexed documents.

These and other benefits of the present technology will be addressed further herein.

FIG. 1 illustrates an example generative response engine system 100 supporting a generative response engine during inference operations in accordance with some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

The generative response engine 110 is an artificial intelligence (AI) that can generate content in response to a prompt. The prompt can be from first entity 140 which can be a human or a software entity (AI or applications). The prompt is generally in natural language but could be in code, including binary, audio formats, visual media, etc. Some examples of the generative response engine can include language models that generate language, such as CHATGPT, or other models, such as DALL-E, which generates images, and SORA, which generates videos. CHATGPT, DALL-E, and SORA are all provided by OPENAI, but the generative response engine is not limited to AI provided by OPENAI. The generative response engine can also be any type of generative AI and can include AI developed using various architectures such as diffusion models and transformers (e.g., a generative pre-trained transformer) and combinations of models.

In some instances, a language model, such as CHATGPT, can receive prompts to output images, video, code, applications, etc., which it can provide by interfacing with one or more other models, as will be addressed further herein.

Users and applications can interact with the generative response engine 110 through the front end 102. The front end 102 serves as the interface and intermediary between the user and the generative response engine. It encompasses the graphical user interface 104 and Application Programming Interfaces (APIs) 106 that facilitate communication, input processing, and output presentation. Generally, users interact through a graphical user interface 104 that often includes a conversational interface, and applications interact through the API 106, but this is not a requirement.

The graphical user interface 104 is the platform through which users interact with the generative response engine 110. It can be a web-based chat window, a mobile application, or any interface that supports data input and output. The graphical user interface 104 facilitates a conversation between the user and the generative response engine, as the user provides prompts in the graphical user interface 104 to which the generative response engine responds and presents those responses in the graphical user interface 104. In some embodiments, graphical user interface 104 presents a conversational interface, which has attributes of a conversation thread between a user account and generative response engine 110.

The graphical user interface 104 is configured to perform input handling, context management, and output presentation. The type of inputs that can be received can be relative to the specifics of the generative response engine 110. But even when a model doesn't directly accept certain types of inputs, the front end 102 might be able to receive different types of inputs, which can be converted to inputs that are accepted by the generative response engine 110. For example, a language model is generally configured to accept text, but the front end 102 can accept voice and convert it to text or accept an image and create a textual representation.

The graphical user interface 104 is also configured to maintain the context of the conversation, which allows for coherent and relevant responses. For example, the graphical user interface 104 is responsible for providing the conversation thread and other relevant context accessible to the front end 102 to the generative response engine along with the specific prompt to the generative response engine. In an example, a conversation between the user account and the generative response engine 110 can have taken several turns (prompt, response, prompt, response, etc.). When the user account provides a further prompt, the graphical user interface 104 can provide that prompt to the generative response engine in the context of the entire conversation.

In another example, the front end 102 might have access to a memory 126 where facts about the user account have been stored. In some embodiments, these facts can have been identified as facts worth storing by the generative response engine and the front end 102 has stored these facts at the direction of the generative response engine. Accordingly, these facts can be provided to the generative response engine 110 along with a user-provided prompt so that the generative response engine has access to these facts when generating a response.

In another example, the graphical user interface 104 might be configured to provide a system prompt along with a user-provided prompt. A system prompt is hidden from the user account and is used to set the behavior and guidelines for the generative response engine. It can be used to define the AI's persona, style, and constraints.

The graphical user interface 104 is also configured to display the responses from the generative response engine, which might include text, code snippets, images, or interactive elements.

In some embodiments, the generative response engine 110 can provide instructions to the front end 102 that instruct the graphical user interface 104 about how to display some of the output from the generative response engine. For example, the generative response engine can direct the graphical user interface 104 to present code in a code-specific format, or to present interactive graphics, or static images. In other examples, the generative response engine can direct the graphical user interface 104 to present an interactive document editor where the graphical user interface 104 can be presented with the document editor so that the user account and the generative response engine can collaborate on the document. In some embodiments, the generative response engine 110 can provide instructions to the front end 102 to record facts in a personalization notepad. Accordingly, the graphical user interface 104 does not always display all of the output of the generative response engine.

As noted above, the front end 102 can also provide one or more application programming interfaces (API(s)) 106. APIs enable developers to integrate the generative response engine's capabilities into external applications and services. They provide programmatic access to the generative response engine, allowing for customized interactions and functionalities.

The APIs 106 can accept structured requests containing prompts, context, and configuration parameters. For example, an API can be used to provide prompts and divide the prompt into system prompts and user prompts. In some embodiments, the APIs 106 can provide specific inputs for which the generative response engine 110 is configured to respond with a specific behavior. For example, an API can be used to specify that it requires an output in a particular format or structured output. For example, in the chat completion API, the API call can specify parameters for the output, such as the max length for the desired output, and specify aspects of the tone of the language used in the response. Some common APIs are for participating in a conversation (Chat Completion API), for providing a single response (Completion API), for converting text into embeddings (Embeddings API), etc. The API can also be used to indicate specific decision boundaries that the generative response engine 110 might be trained to interpret. For example, the moderation API can take advantage of the generative response engine's content moderation decision-making. In the case of the moderation API and others, the API might give access to services other than the generative response engine. For example, the moderation API might be an interface to moderation system 138, addressed below.

Some other common APIs include the Fine-Tuning API, which allows developers to customize models of the generative response engine using their own datasets; the Audio and Speech APIs, which cause the generative response engine to output speech or audio; and the Image Generation API, which causes the generative response engine to output images (which might require utilizing other models).

There can also be APIs that direct the generative response engine to interface with other applications or other generative AI engines. In such cases, the specific application or AI engine might be specified, or the generative response engine might be allowed to choose another application of AI engine to utilize in response to a prompt.

In short, the graphical user interface 104 and the APIs 106 can be used to provide prompts to the generative response engine. Prompts are sometimes differentiated into prompt types. For example, a system prompt can be a hidden prompt that sets the behavior and guidelines for the generative response engine. A user prompt is the explicit input provided by the user, which may include questions, commands, or information.

Sitting in between front end 102 and generative response engine 110 is a system architecture server 120. The function of system architecture server 120 is to manage and organize the flow of data among key subsystems, enabling the generative response engine 110 to generate responses that are contextually relevant, accurate, and enriched with additional information as required.

Action 122 facilitates auxiliary tasks that extend beyond basic response generation. In some embodiments, action 122 can be actions that correspond to an API 106. In some embodiments, action 122 can be agentic actions that the generative response engine 110 decides to take to carry out a user's intent as described in the prompt.

Conversation thread 124 includes at least the prompt (the request or command provided by the user account through front end 102). In some embodiments, conversation thread 124 can be further supplemented by a system prompt and other information that might be included by graphical user interface 104 or API 106. In some embodiments, conversation thread 124 can even be modified or enhanced by generative response engine 110 as addressed further below. Additionally, as the user account provides prompts and generative response engine 110 provides responses, a conversation is recorded in conversation thread 124. As the user account provides a new prompt and the generative response engine 110 provides a response, these are appended to the overall conversation and added to conversation thread 124. Thus, a user account might think of a first user-provided message as a first prompt and a second user-provided message as a second prompt, and so on, but conversation thread 124 as perceived by generative response engine 110 can include a thread of user-provided messages and responses from generative response engine 110 in a multi-turn conversation. Generally, conversation thread 124 will include an entire conversation thread, but in some instances, conversation thread 124 might need to be shortened if it exceeds a maximum accepted length (generally measured by a number of tokens).

System architecture server 120 can also route prompts and response through moderation system 138, which can be separate or part of system architecture server 120. In some embodiments, prompts are provided to prompt safety system 134 before being provided to generative response engine 110. Prompt safety system 134 is configured to use one or more techniques to evaluate prompts to ensure a prompt is not requesting generative response engine 110 to generate moderated content. In some embodiments, prompt safety system 134 can utilize text pattern matching, classifiers, and/or other AI techniques.

Since conversation threads can evolve over time through the course of a conversation, consisting of prompts and responses, conversation threads can be repeatedly evaluated at each turn in the conversation.

Memory 126 can facilitate continuity and personalization in conversations. It allows the system to maintain user-specific context, preferences, or details that may inform future interactions. A memory file can be persisted data from previous interactions or sessions that provide background information to maintain continuity. In some embodiments, memory can be recorded at the instruction of generative response engine 110 when generative response engine 110 identifies a fact or data that it determines should be saved in memory because it might be useful in later conversations or sessions.

Conversation metadata 128 can aggregate data points relevant to the conversation, including user conversation thread 124, action 122, and memory 126. This consolidated information package serves as the input for generative response engine 110. Conversation metadata 128 can label parts of a prompt as user provided, generative response engine provided, a system prompt, memory 126, data from action 122 or tool 130 (addressed below).

The generative response engine is the core engine that processes inputs (from system architecture server 120) and generates outputs. In some embodiments, the generative response engine is a Generative Pre-trained Transformer (GPT), but it could utilize other architectures.

A core feature of the generative response engine 110 is to generate content in response to prompts. When the generative response engine 110 is a GPT, it is configured to receive inputs from front end 102 that provide guidance on a desired output. The generative response engine can analyze the input and identify relevant patterns and associations in the data, and it has learned to generate tokens that are predicted as the most likely continuation of the input. The generative response engine 110 generates responses by sampling from the probability distribution of possible tokens, guided by the patterns observed during its training. In some embodiments, the generative response engine 110 can generate multiple possible responses before presenting the final one. The generative response engine 110 can generate multiple responses based on the input, and these responses are variations that the generative response engine 110 considers potentially relevant and coherent.

In some embodiments, the generative response engine 110 can evaluate generated responses based on certain criteria. These criteria can include relevance to the prompt, coherence, fluency, and sometimes adherence to specific guidelines or rules, depending on the application. Based on this evaluation, the generative response engine 110 can select the most appropriate response. This selection is typically the one that scores highest on the set criteria, balancing factors like relevance, informativeness, coherence, and content moderation instructions/training.

In some embodiments, an instruction provided by an API 106, a system prompt, or a decision made by generative response engine 110 can cause the generative response engine 110 to interpret a prompt and re-write it or improve the prompt for a desired purpose. For example, generative response engine 110 can determine to take a prompt to make a picture and enhance the prompt to yield a better picture. In these instances, generative response engine 110 can generate its own prompts, which can be provided to a tool 130 or provided to generative response engine 110 to yield a better output response than the original prompt might have.

The generative response engine 110 can also do more than generate content in response to a prompt. In some embodiments, the generative response engine 110 can utilize decision boundaries to determine the appropriate course of action based on the prompt. In some examples, a decision boundary might be used to cause the generative response engine to recognize that it is being asked to provide a response in a particular format such that it will generate its response constrained by the particular format. In some examples, a decision boundary can cause the model to refuse to generate a responsive output if the decision is that the responsive output would violate a moderation policy. In some examples, the decision boundary might cause the generative response engine to recognize that it needs to interface with another AI model or application to respond to the prompt. For example, when the generative response engine is a language model, it might recognize that it is being asked to output an image, and therefore, it needs to interface with a model that can output images to provide a response to the prompt. In another example, the prompt might request a search of the Internet before responding. The generative response engine can use a decision boundary to recognize that it should conduct a search of the Internet and use the results of that search in responding to the prompt. In another example, the prompt might request that the generative response engine take an agentic action on behalf of the user by interacting with a third-party service (e.g., book a reservation for me at . . . ), and the generative response engine can utilize a decision boundary to recognize that it needs to plan steps to locate the third-party service, contact the third-party service, and interact with the third-party service to complete the task and then report back to the user that the action has been completed.

When generative response engine 110 determines that it should take an agentic action on behalf of the user or it should call a tool to aid in providing a quality response to the user account, the generative response engine 110 might call a tool 130 or cause an action 122 to be performed. As indicated above, tools 130 can include internet browsers, editors such as code editors, file search tool 132, other AI tools etc. Actions 122 are actions that the generative response engine 110 can cause to be performed, perhaps using tool 130. As used herein actions 122 should be considered to cover a broad array of actions that generative response engine 110 can perform with or without tools 130. Tools 130 are considered to cover a wide variety of services and software that encompass tools such as a computer operating system such that the generative response engine 110 can control the computer operating system on the user's behalf, to robotic actuators, to search browsers and specific applications.

Additionally, the generative response engine 110 can also generate portions of responses that are not displayed to the user. For example, the generative response engine 110 can direct the front end 102 to provide specific behaviors, such as directions for how to present the response from the generative response engine 110 to the user account. In another example, the generative response engine 110 can provide response portions dictated by an API, where portions of the response to the API might be for the consumption of the calling application but not for presentation to the end user.

In some embodiments, the output of generative response engine can be further analyzed by output safety system 136. While generative response engine 110 can perform some of its own moderation, there can be instances where it is desired to have another service review outputs for compliance with the moderation policy. The use of dashed lines in FIG. 1 differentiates a path using output safety system 136 and not using output safety system 136.

While FIG. 1 shows responses being provided back to front end 102 directly, in some embodiments, the responses might be returned by way of system architecture server 120.

In some embodiments, generative response engine system 100 can also include various services that are configured to provide specialized functions or configurations of generative response engine system 100. For example, assistant service 150 can configure generative response engine system 100 to act like an assistant. Generative response engine system 100 can provide an assistants API as part of API 106, which can allowed user accounts to call a configured virtual of the generative response engine for a virtual assistant like interaction. As addressed herein, configuring the virtual assistant can involve giving the virtual assistant specific system instructions (i.e., a system message) that is unique to a particular assistant, giving the assistant access to a specific set of knowledge, giving the assistant access to particular tools, and enabling a long conversation context window so that the assistant can have context generated from previous conversations. Assistant service 150 provides functionality for creating, configuring, maintaining, and loading a virtual assistant so that it can be called via the Assistants API (which is a collection of APIs relevant to creating, configuring, maintaining, and using a virtual assistant). While assistant service 150 is primarily addressed as being accessible via API 106, the functionality provided by assistant service 150 can also be accessible through graphical user interface 104.

Figure 2:
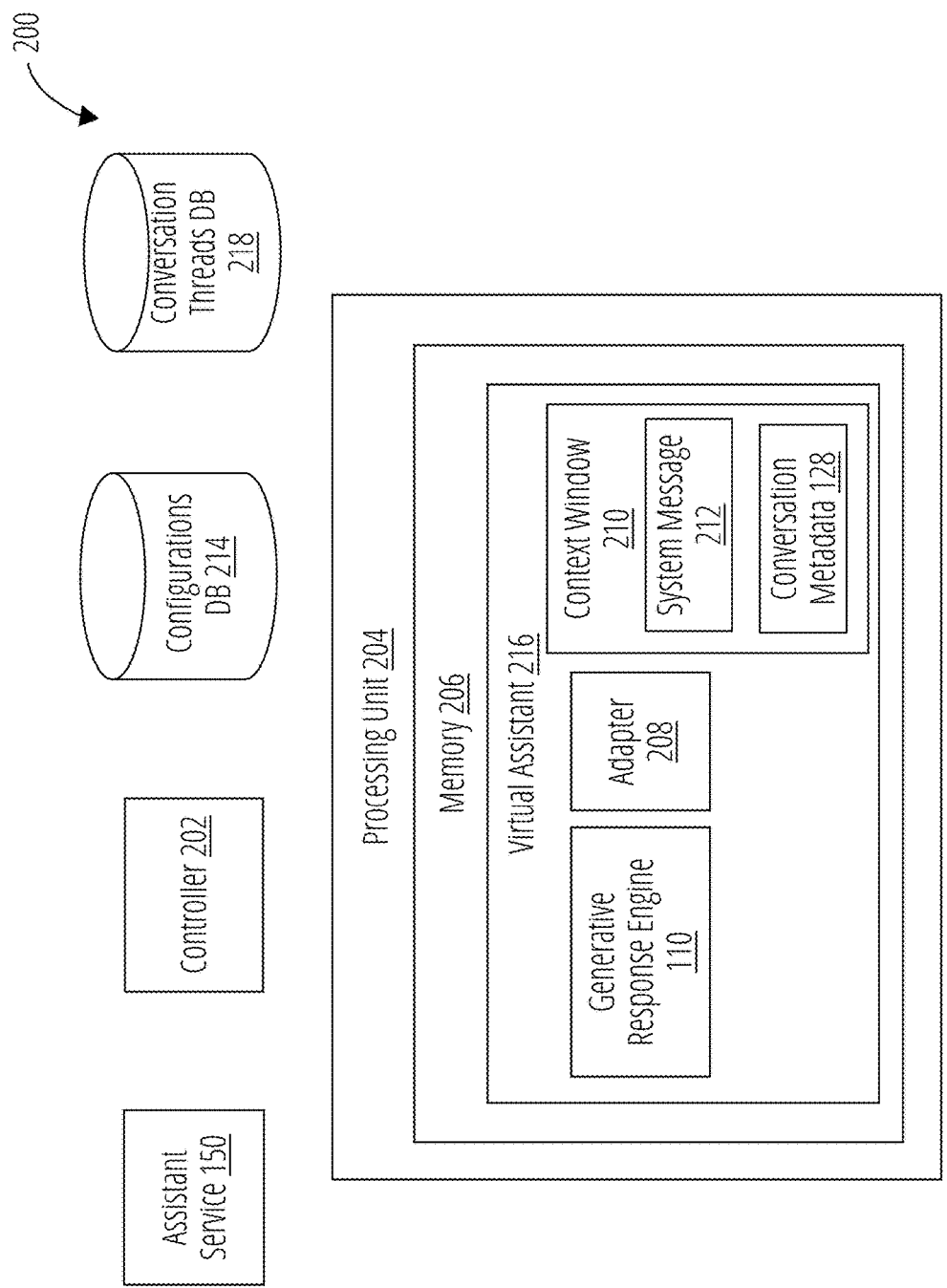
FIG. 2 illustrates components within a data center in accordance with some embodiments of the present technology.

FIG. 2 illustrates components within a data center in accordance with some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, some components can be divided into separate components, some components might not be present or needed, and additional components may be present.

While the components in FIG. 2 are all illustrated as being in data center 200, it is not required that all components be located in data center 200. Data center 200 should not be limited to a single data center 200. Instead, the component could be part of a hyperscaler running a public cloud that has many data centers 200. Actually, data center 200 could be a single computing device or a network of computing devices.

As addressed herein, assistant service 150 can be responsible for configuring a virtual assistant, storing configurations for the virtual assistant, and causing virtual assistant to be loaded into memory 206 of processing unit 204.

Virtual assistant 216 is at its foundation generative response engine 110 that is configured with specific instructions that are included in system message 212. These instructions modify and maybe even override a default system message that is generally used with generative response engine 110. Additionally, virtual assistant 216 includes context from past interactions. For example, if virtual assistant 216 were configured to help first entity 140 on a project or many projects of the same type, first entity 140 would want virtual assistant 216 to have at least some context from past interactions. Just like working with a human assistant, first entity 140 would not want to have to repeat previous instructions and would not want the human assistant to forget about a project they worked on recently. Accordingly, virtual assistant 216 maintains this context as part of a longer than normal conversation thread stored in conversation threads DB 218 in FIG. 2. In some embodiments, a conversation thread can be any length. However, since context window 210 for generative response engine might be limited to a maximum number of tokens, the conversation thread might be smartly shortened and provided as conversation metadata 128. Collectively system message 212 and conversation metadata 128 make up the context window 210 to which virtual assistant 216 has access during inference operations.

While many virtual assistants might be comprised of a general instance of generative response engine 110 plus context window 210, in some embodiments, first entity 140 might want to further train (fine-tuning and/or reinforcement learning) generative response engine 110 to be better at its task. In such embodiments, virtual assistant 216 also includes an adapter 208 which modifies the weights of some associations in some layers of generative response engine 110. One way of thinking of generative response engine 110 is an artificial intelligence tool that is defined by weights between nodes in a plurality of layers. Thus, when adapter 208 is included, the generative response engine 110 becomes a slightly different version of generative response engine 110 because some of its weights are modified by adapter 208.

The configurations that make up virtual assistant 216 can be stored in configurations DB 214. Assistant service 150 can receive instructions, as will be addressed herein, configuring virtual assistant 216 and can store these configurations including system message 212, conversation metadata 128, and adapter 208 in configurations DB 214.

When first entity 140 desires to interact with virtual assistant 216, assistant service 150 can communicate with controller 202 to cause controller 202 to load generative response engine 110 and context window 210 (and adapter 208 if applicable) into memory 206 of a processing unit 204 that will run virtual assistant 216. Processing unit 204 can include one or more graphical processing units and/or computer processing units with access to model weights (from generative response engine 110 (and adapter 208 if applicable) to process messages to the assistant based on context window 210. Processing unit 204 can also include a combination of graphical processing units and computer processing units. For example, virtual assistant 216 and any adapter 208 can be loaded into memory attached to one or more graphical processing units, while context window 210 can be loaded into memory attached to one or more computer processing units, and the graphical processing units and computer processing units can be in communication. In this example, the graphical processing units combined with the computer processing units make up processing unit 204.

While FIG. 2 has been described with one or more components communicating with other components, it should be appreciated that this communication might be indirect and will likely take place through direction or routing by one or more other components.

Additionally, while FIG. 2 is addressed as a data center, processing unit 204 could execute on a personal computing device depending on the capabilities of the personal computing device and the amount of memory required to run generative response engine 110. Some generative response engines 110 require less memory than others.

Figure 3:
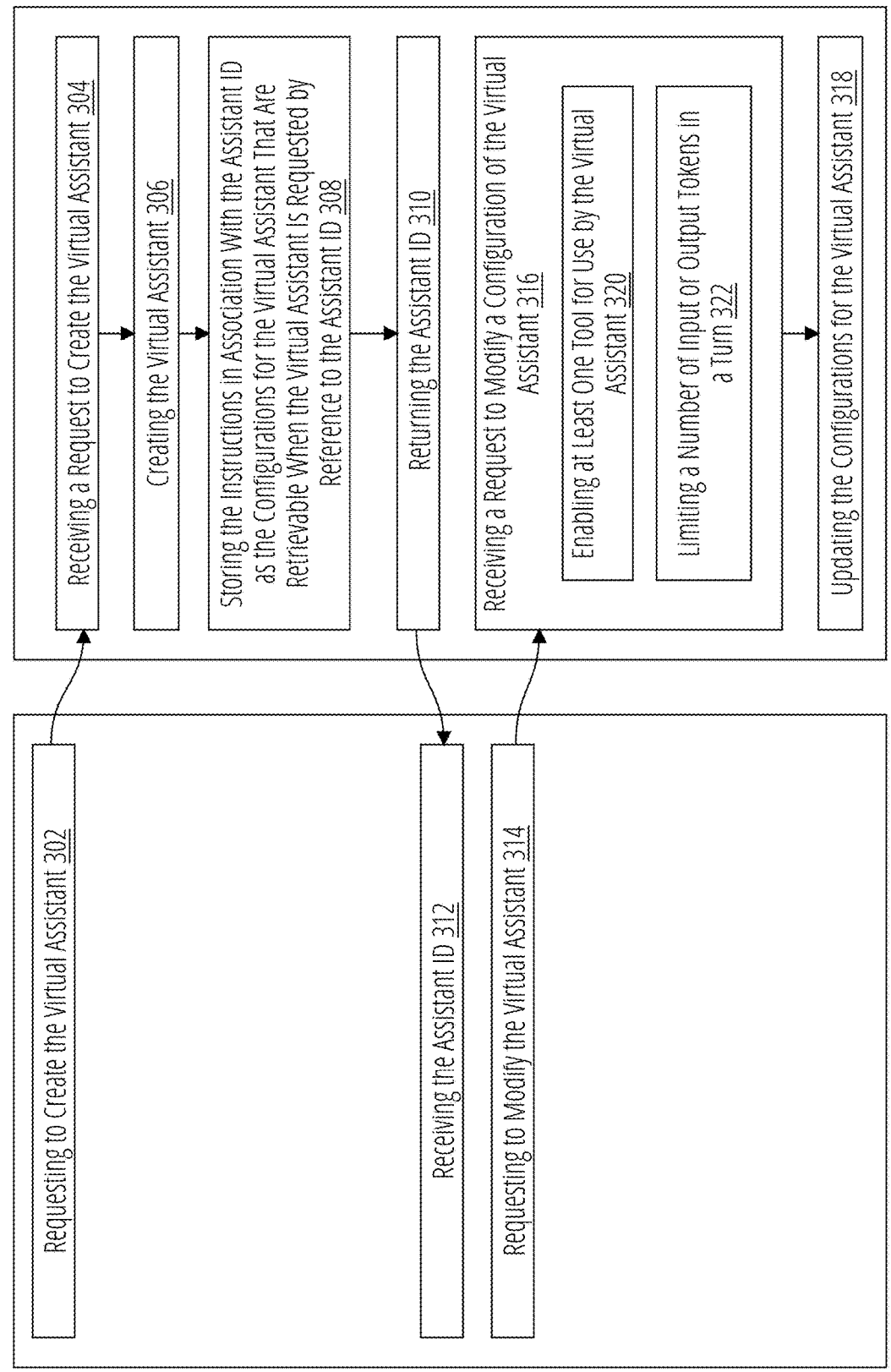
FIG. 3 illustrates an example method for configuring a virtual assistant in accordance with some embodiments of the present technology.

FIG. 3 illustrates an example method for configuring a virtual assistant in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

A first entity may want to create a virtual assistant to streamline processes, enhance user engagement, and automate repetitive tasks. Virtual assistants can provide tailored interactions, improve operational efficiency, and offer on-demand assistance, making them valuable tools for businesses, organizations, or individuals. For example, a virtual assistant can act as a customer service representative, a scheduling assistant, a knowledge retrieval system, or any other type of assistant, depending on the configurations provided.

A first entity can be a human user, an application, or an organization with human users and applications, that configure and use a persistent virtual assistant. For example, a first entity might include a human developer that configures the virtual assistant, while an application that is part of the first entity calls the virtual assistant once it is configured. Both the human user and the application would be considered the first entity in the above example. In another example, the first entity can be one or more human users of an organization, where one or more human users configure and then use the configured virtual assistant. In another example, the first entity can be one or more applications or application instances that configure and then use the configured virtual assistant. It is not required that all human users or applications are part of the same organization to be the same first entity. Though, any human user or application should have valid privileges to modify or use the virtual assistant. In some instances, valid privileges mean that the first entity has access to an API token or user account that has privileges to communicate with the virtual assistant. In some instances, valid privileges mean that the first entity is the creator of the virtual assistant or the virtual assistant has been shared and associated with the first entity's API token or user account.

According to some examples, the method includes requesting to create the virtual assistant at block 302. For example, first entity 140 illustrated in FIG. 1 may request to create the virtual assistant. First entity 140 can be a human operating a computing device, or an application executing instructions. In some embodiments, the request is sent by calling an application programming interface (API) exposed by generative response engine system 100.

Complimentary to block 302, according to some examples, the method includes receiving the request to create the virtual assistant at block 304. For example, front end 102 illustrated in FIG. 1 may receive the request to create the virtual assistant. In some embodiments, generative response engine system 100 may offer the API for the purpose of configuring a virtual assistant, and the request is received via the API.

The request includes instructions that, at least in part, define customized behaviors for the virtual assistant. For example, a first entity can define several parameters to tailor the virtual assistant's behavior and capabilities. The primary parameters include 'name', 'description', 'instructions', 'tools', and 'model'.

The 'name' parameter assigns a unique identifier to the virtual assistant, facilitating its distinction from other virtual assistants. The 'description' often provides a concise overview of the assistant's purpose and functionality, aiding users in understanding its intended use. The 'instructions' parameter allows the first entity to specify detailed guidelines that direct the assistant's interactions, ensuring responses align with desired behaviors and objectives. As will be addressed herein, these instructions are often incorporated in system message 212 associated with the virtual assistant.

The 'tools' parameter enables the integration of specific functionalities that the assistant can utilize to enhance its performance. These tools may include capabilities such as code interpretation, internet searching, function calling, or file searching, which expand the virtual assistant's ability to process and analyze data effectively. By specifying the appropriate tools, the first entity can customize the virtual assistant's skill set to meet particular requirements.

The 'model' parameter determines the underlying generative response engine that powers the virtual assistant. For example, OPENAI offers various models with differing capabilities and performance characteristics. In some embodiments, it may be possible to choose generative response engine from different generative response engine providers (GOOGLE, META, ANTRHOPIC, MICROSOFT, HUGGING FACE, MISTRAL, etc.). By selecting a suitable generative response engine, the first entity can balance factors such as response quality, speed, and computational resources to align with the first entity's needs.

Another parameter that can be used to configure the virtual assistant is the "response format" parameter. This parameter can be used to define a format in which responses that are output by the assistant. This can be very useful when the first entity is an application that is configured to receive responses in a particular format so that the response is able to be parsed by deterministic code. More specifically, using this parameter, the first entity can send, and the API can receive, a JSON schema that defines a format in which the generative response engine will strictly confine its responses. More information about this capability of the virtual assistant is described in 67/716,446 filed on Nov. 5, 2024, which is incorporated by reference herein.

According to some examples, the method includes creating the virtual assistant at block 306. For example, the assistant service 150 illustrated in FIG. 1 may create the virtual assistant based on the values or arguments associated with the parameters. The creation of the virtual assistant includes, at a minimum, assigning an assistant ID to the virtual assistant.

In some embodiments, the virtual assistant might require completion of one or more processes to be completed before the virtual assistant is configured and ready to use. For example, the creation of the virtual assistant might include the execution of one or more synchronous or asynchronous processes. Accordingly, the first entity can enable streaming responses to receive streaming updates on the progress of creating the virtual assistant. In some embodiments, the first entity can use a poll and response API parameter to refresh the status of the virtual assistant. As will be addressed further herein, one process that can take some processing time to enable is the searching of files using a file search tool.

According to some examples, the method includes storing the instructions in association with the assistant ID as the configurations for the virtual assistant that are retrievable when the virtual assistant is requested by reference to the assistant ID or assistant name at block 308. For example, assistant service 150, illustrated in FIG. 1, may store the instructions in association with the assistant ID as the configurations for the virtual assistant that are retrievable when the virtual assistant is requested by reference to the assistant ID or the virtual assistant name.

According to some examples, the method includes returning the assistant ID at block 310. For example, front end 102 illustrated in FIG. 1 may return the assistant ID.

According to some examples, the method includes receiving the assistant ID at block 312. For example, first entity 140 illustrated in FIG. 1 may receive the assistant ID.

According to some examples, the method includes requesting to modify the virtual assistant at block 314. For example, first entity 140 illustrated in FIG. 1 may request to modify the virtual assistant. While FIG. 3 illustrates modifying the virtual assistant, this is for illustration purposes only to show that the virtual assistant can be modified after creation. However, the configurations described below could just as well have been provided with the request to create the virtual assistant.

Two example configurations that can be set or modified are: a request to modify the virtual assistant includes instructions to enable at least one tool for use by the virtual assistant or to limit the number of input tokens that can be provided to the virtual assistant in a turn, and/or instructions to limit the number of output tokens that the virtual assistant can output in response to the request in the turn. A request to modify the virtual assistant includes instructions identifying a particular generative response engine to be used by the virtual assistant.

According to some examples, the method includes enabling at least one tool for use by the virtual assistant at block 320. Enabling at least one tool for use by the virtual assistant is in response to an instruction in the request to create the virtual assistant or a request to modify the virtual assistant. The at least one tool can be, for example, a code interpreter tool, a function tool, or a file search tool. The at least one tool enabled for use by the virtual assistant is stored as part of the configurations for the virtual assistant.

According to some examples, the method includes limiting the number of input or output tokens in a turn at block 322. A turn includes the prompt and the response, and further prompt and response iterations are further turns. The system comprises a generative response engine system 100 and a first entity 140.

According to some examples, the method includes receiving a request to modify a configuration of the virtual assistant at block 316. For example, the front end 102 illustrated in FIG. 1 may receive a request to modify a configuration of the virtual assistant.

The request to create or modify the virtual assistant can include instructions identifying a particular generative response engine to be used by the generative response engine. While, above, it was disclosed that the generative response engine could be a generative response engine provided by a generative response engine providers, the generative response engine could be a custom fine-tuned version of the generative response engine. The first entity could fine-tune a generative response engine provided by a generative response engine provider. As addressed with respect to FIG. 2, the custom fine-tuned version of the generative response engine includes the generative response engine and a LoRA adapter, which customizes some weights of the generative response engine.

According to some examples, the method includes updating the configurations for the virtual assistant at block 318. For example, the assistant service 150 illustrated in FIG. 1 may update the configurations for the virtual assistant.

In some embodiments, the virtual assistant can be configured to handle multiple tasks simultaneously by enabling parallel processing capabilities. This allows the assistant to manage concurrent user interactions efficiently, improving response times and user satisfaction. This functionality can be configured by allocating additional processing resources within the backend system and enabling asynchronous handling of tasks via the API.

In some embodiments, the virtual assistant can be integrated with external databases or knowledge bases, allowing it to provide more accurate and contextually relevant responses by accessing up-to-date information. This integration enhances the assistant's ability to handle complex queries requiring specialized knowledge. Developers can configure this by linking the assistant's backend with API endpoints for the relevant databases or knowledge repositories.

In some embodiments, the virtual assistant can be integrated with various communication platforms, such as email, messaging apps, and social media, allowing it to interact with users across multiple channels. This multichannel support ensures that users can access the assistant through their preferred communication mediums. Configuration requires API integrations with the chosen communication platforms.

In some embodiments, the virtual assistant can be configured to execute specific tasks or functions by integrating with external APIs or services. This functionality enables the assistant to perform actions such as booking appointments, retrieving data, or controlling smart devices, thereby extending its utility beyond simple information retrieval. Developers can specify these integrations by defining task-specific API calls and associated workflows.

In some embodiments, the virtual assistant can be configured to provide explanations or justifications for its responses, enhancing transparency and building user trust. This explainability feature allows users to understand the reasoning behind the assistant's answers, making interactions more informative and reliable. This can be implemented by enabling a feature that generates response annotations or metadata with justifications.

In some embodiments, the virtual assistant can be equipped with proactive notification capabilities, allowing it to initiate interactions by providing users with timely reminders or updates. This proactive behavior enhances user engagement and ensures that important information is communicated effectively. Configuration involves setting up scheduling systems and notification triggers linked to user preferences.

In some embodiments, the virtual assistant can be integrated with scheduling tools, allowing it to manage appointments, set reminders, and coordinate events for users. This scheduling capability enhances the assistant's utility as a personal organizer. Configuration involves connecting the assistant to calendar systems via APIs and defining scheduling logic.

Figure 4:
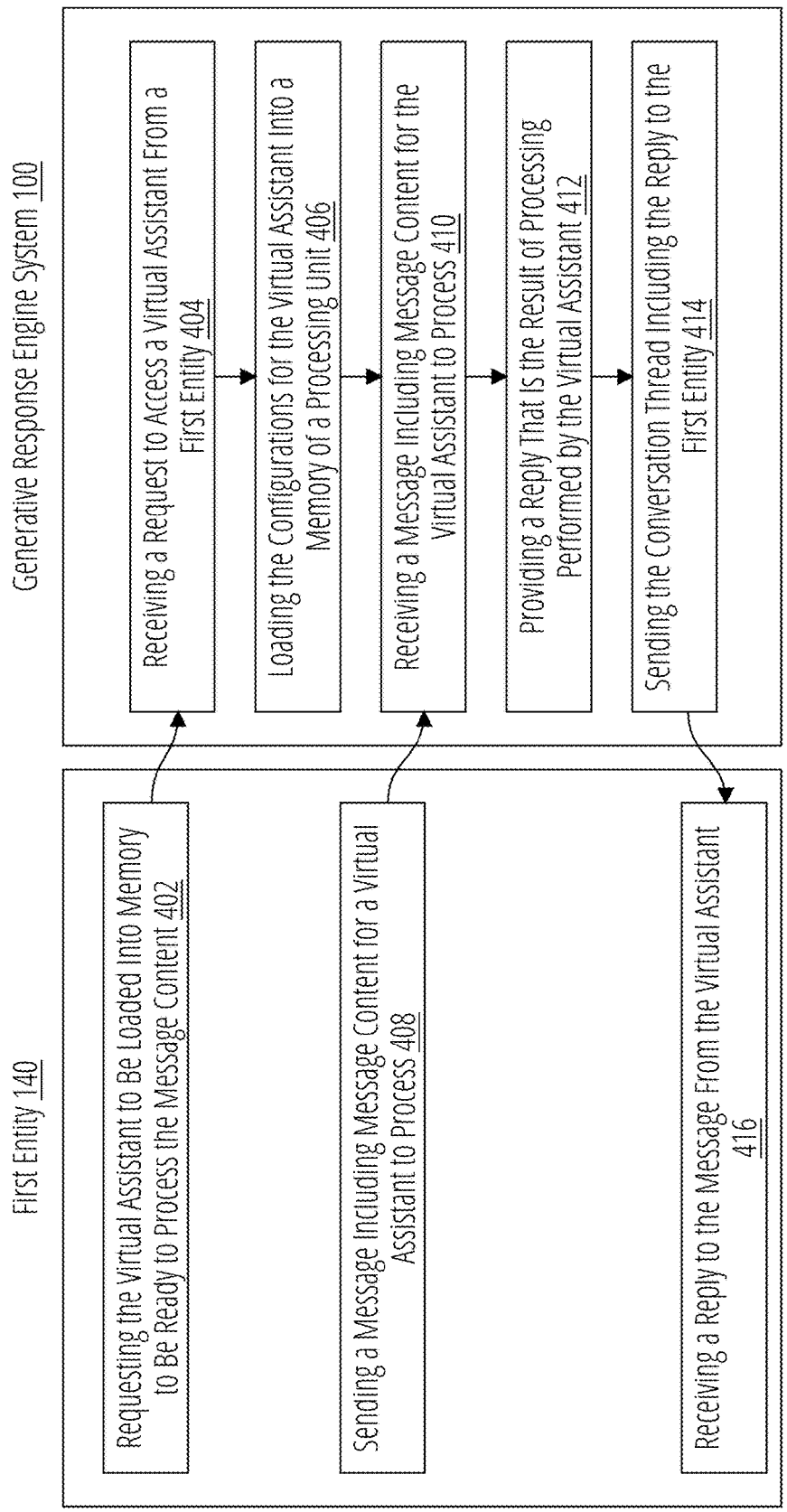
FIG. 4 illustrates an example method for a first entity interacting with a virtual assistant in accordance with some embodiments of the present technology.

FIG. 4 illustrates an example method for a first entity interacting with a virtual assistant in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

A first entity can be a human user, an application, or an organization with human users and applications, that configure and use a persistent virtual assistant. For example, a first entity might include a human developer that configures the virtual assistant, while an application that is part of the first entity calls the virtual assistant once it is configured. Both the human user and the application would be considered the first entity in the above example. In another example, the first entity can be one or more human users of an organization, where one or more human users configure and then use the configured virtual assistant. In another example, the first entity can be one or more applications or application instances that configure and then use the configured virtual assistant. It is not required that all human users or applications are part of the same organization to be the same first entity. Though, any human user or application should have valid privileges to modify or use the virtual assistant. In some instances, valid privileges mean that the first entity has access to an API token or user account that has privileges to communicate with the virtual assistant. In some instances, valid privileges mean that the first entity is the creator of the virtual assistant or the virtual assistant has been shared and associated with the first entity's API token or user account.

According to some examples, the method includes requesting the virtual assistant and a conversation thread (identified by a conversation thread ID) to be loaded into memory to be ready to process the message content at block 402. For example, first entity 140 illustrated in FIG. 1 may request the virtual assistant to be loaded into memory to be ready to process the message content.

The virtual assistant can be identified by an assistant ID, wherein the virtual assistant is a generative response engine that is adapted to exhibit customized behaviors during inference operations. For the most part, the customized behaviors are defined in configurations for the virtual assistant, but some customized behaviors can be the result of the interactions between the first entity and the virtual assistant as recorded in the conversation thread.

The conversation thread can also be identified by a conversation thread ID. The conversation thread is a separate entity from the virtual assistant. Multiple virtual assistants can access the same conversation thread, even at the same time. The contents of the conversation thread can also modify the behavior of the virtual assistant slightly, as the conversation thread might include context from past interactions that the virtual assistant can use to provide more relevant responses.

The request to load the virtual assistant can be sent prior to or at the same time as sending the message for the virtual assistant to process. In some embodiments, the sending of a message to a conversation thread (identified by the conversation thread ID) for the virtual assistant (identified by the virtual assistant ID) can imply the request to load the conversation thread and virtual assistant, and the request to load the virtual assistant and conversation thread does not need to be made explicitly.

In some embodiments, the request to load the conversation thread into memory can be a request to create a new conversation thread, in which case, a new conversation thread ID can be returned to the first entity.

According to some examples, the method includes receiving a request to access a virtual assistant and a conversation thread from a first entity at block 404. For example, front end 102 illustrated in FIG. 1 may receive a request to access a virtual assistant from a first entity. The request to access the virtual assistant can identify the virtual assistant by its assistant ID and the conversation thread by a conversation thread ID.

The virtual assistant can be a generative response engine that is adapted to exhibit customized behaviors during inference operations. The customized behaviors are defined in configurations for the virtual assistant. Thus, generative response engine system 100 needs to load the appropriate generative response engine and the configurations that adapt the generative response engine.

According to some examples, the method includes loading the configurations for the virtual assistant into a memory of a processing unit at block 406. For example, assistant service 150 illustrated in FIG. 1 may load the configurations for the virtual assistant into the memory of a processing unit in response to receiving the request to access the virtual assistant. In some embodiments, the processing unit is processing unit 204, which can include one or more graphical processing units and/or computer processing units.

As addressed herein, the loading the configurations for the virtual assistant can including loading any instructions that customize the behavior of the virtual assistant, such as system messages, and loading conversation threads that can provide the virtual assistant with context of its past performance of tasks and communications with the first entity. In some embodiments, the configurations for the virtual assistant can also include any adapters, such as adapter 208, that might slightly change the weights of the generative response engine to yield a fine-tuned version of the generative response engine.

In some embodiments, assistant service 150 can first check to make sure the assistant ID and the conversation thread ID are associated with an API key or user account associated with the request that is permitted to access the virtual assistant having the assistant ID and conversation thread having the conversation thread ID.

Figure 5:
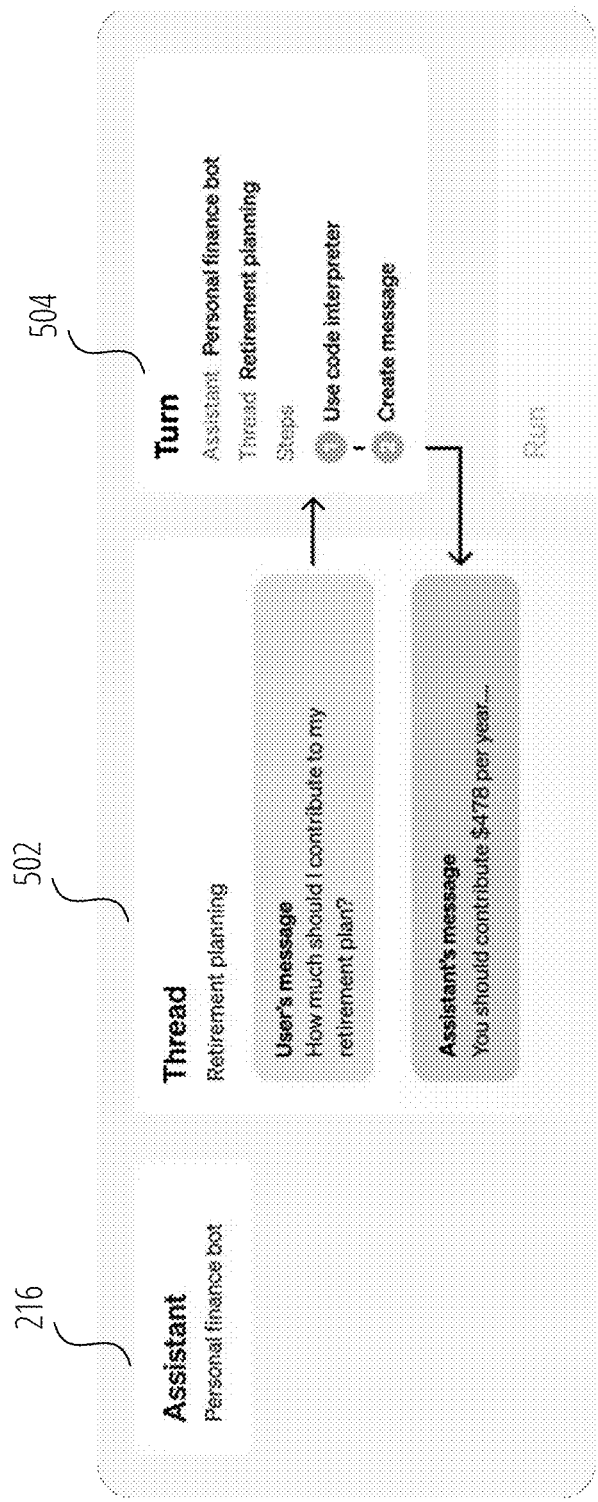
FIG. 5 illustrates an aspect of the subject matter in accordance with one embodiment.

According to some examples, the method includes sending a message including message content for a virtual assistant to process at block 408. For example, first entity 140 illustrated in FIG. 1 may send a message including message content for the virtual assistant to process. The message content could be anything. It could be natural language, it could be computer code, it could be an image, video, audio, or any combination thereof. The message content should be relevant to configurations for the virtual assistant in order to get the best results. For example, if the configurations for the virtual assistant pertain to giving personal financial advice, as illustrated in FIG. 5, the message content should be relevant to personal finances.

The message can be accompanied by a conversation thread ID that identifies a conversation thread to which the message should be posted. A virtual assistant can have many threads. Conversation threads in the context of the assistant API serve as a means to organize and maintain continuity in interactions. A first entity may choose to keep interacting with an existing thread to retain context from prior messages, allowing the virtual assistant to provide more informed and relevant responses. Alternatively, the first entity might create a new thread to initiate a separate, unrelated interaction. This functionality enables the virtual assistant to handle multiple distinct conversations efficiently while ensuring clarity and separation between topics. For example, the virtual assistant for giving personal financial advice, illustrated in FIG. 5, might utilize different conversation threads for retirement planning advice and advice about paying off credit card debt. Thus, in this example, the conversation threads could be divided by topics. FIG. 5 illustrates conversation thread 502 for retirement planning topics. The financial advice application (first entity) can direct retirement planning questions from users to conversation thread 502, and direct questions from users about other topics to other conversation threads. In this example, the financial advice application (first entity) is configured to return responses to the appropriate user since the conversation thread can include advice pertaining to different users. In another example, the first entity can be an application that services a number of different user accounts of the application in the performance of a particular task. In this example, the different conversation threads could be reserved for each different user account of the application. The first entity can spawn new conversation threads as desired.

In some embodiments, different virtual assistants can access the same conversation thread. When multiple assistants access the same thread, this can allow specialized assistants to perform sub-tasks and communicate about their progress or completion of that assistant's role. In this way, multiple assistants can work together. Alternatively, different assistants can access the same thread independently for the purpose of having access to shared context. For example, in an instances where a user is interacting with an application, where the application is utilizing an assistant, the user might not appreciate that a different assistant might be called by the application and the user would expect their past context with the application to be remembered. This memory of past interactions can be preserved even when interacting with a different virtual assistant when the virtual assistant accesses the conversation thread that is a record of those past interactions.

In some embodiments, the message for the virtual assistant to process is also accompanied by an identification of a tool that the virtual assistant should use when processing the message. As addressed herein, the virtual assistants can have access to one or more tools such as code interpreter tool, file search tool, web search tool, function tool, etc. As illustrated in FIG. 5, the example virtual assistant uses a code interpreter tool to calculate a yearly savings rate to meet a retirement goal. In such instances, the message for the virtual assistant can indicate that the virtual assistant should call the tool. This can be useful when the virtual assistant is configured to use multiple different tools; in this way, the message can specify the tool that is desired to be called for the particular message. In other examples, the configurations for the virtual assistant might indicate that the virtual assistant should call the tool and when. More detail on such tools is addressed in U.S. provisional application No. 63/558,460, filed on Feb. 27, 2024, and titled "SYSTEMS AND METHODS FOR GENERATING AND EXECUTING FUNCTION CALLS USING MACHINE LEARNING, and U.S. provisional application No. 63/558,514, filed on Feb. 27, 2024, and titled "SYSTEMS AND METHODS FOR INTERPRETING COMPUTER CODE WITH A MULTIMODAL MACHINE LEARNING MODEL," which are incorporated by reference, in their entireties, herein.

According to some examples, the method includes receiving a message including message content for the virtual assistant to process at block 410. For example, the front end 102 illustrated in FIG. 1 may receive a message including message content for the virtual assistant to process. As addressed above, the message can identify a conversation thread and/or a tool for the virtual assistant to use.

The message for the virtual assistant can originate with a user accessing the virtual assistant through an application, or from the application (which could be another virtual assistant). In some embodiments, the message can be labeled to indicate the source of the message. For example, a message could indicate the message originated with the user, or the application.

In some embodiments, the application can also provide a message labeled as if it were from the virtual assistant. When the application provides a message labeled as if it were from the virtual assistant, the message can be posted to the conversation thread as if the virtual assistant had generated the message. In this way, the application can artificially generate context for the virtual assistant, and cause the virtual assistant to act as if it had generated the message. Future responses from the virtual assistant might reference the artificially generated message. This can be useful when the application provided a message to the user account, and the application wants the virtual assistant to believe it was the source of the message. This can also be useful to steer the virtual assistant towards a conversational direction desired by the application or user account.

The message can be received through an application programming interface (API). In some embodiments, the API can support streaming responses, whereby the response from the virtual assistant is streamed to the first entity as it is generated. In some embodiments, the API might only be configured to receive polling requests to check for updates to the conversation thread in which a response will be posted.

According to some examples, the method includes providing a reply that is the result of processing performed by the virtual assistant at block 412. For example, the front end 102 illustrated in FIG. 1 may provide a reply that is the result of processing performed by the virtual assistant. The processing is informed by the configurations for the virtual assistant and the message content. The reply is provided to the conversation thread identified by the thread ID.

According to some examples, the method includes sending the conversation thread including the reply to the first entity at block 414. For example, the front end 102 illustrated in FIG. 1 may send the conversation thread including the reply to the first entity. As indicated above, the reply might be streamed back to the first entity or might be retrieved by the first entity by polling for updates to the conversation thread.

According to some examples, the method includes receiving a reply to the message from the virtual assistant at block 416. For example, the first entity 140 illustrated in FIG. 1 may receive a reply to the message from the virtual assistant. In some embodiments, the first entity may periodically request updates to the thread to trigger the sending of the updated thread.

In some embodiments, the first entity can have access to more than one virtual assistant. For example, a user account could use a first virtual assistant to help make travel reservations and a second virtual assistant to help order groceries. In another example, a first entity that is an application could call multiple virtual assistants for the performance of the same larger function. For example, the application can be for helping a student stay organized and get their homework done. The application could call a first virtual assistant to perform a task of reviewing and populating a to-do list, and could call a second virtual assistant to assist with doing math homework, and a third virtual assistant to assist with doing a group project, etc. In another example, the application could be a presentation-making application. The application could call a first virtual assistant that is configured to review a collection of documents using a file search tool to extract details that would be useful to outline a presentation. The application could then call a second virtual assistant to convert the outline to slides or a poster for a presentation. All of the virtual assistants can access the same conversation thread or a separate conversation threads.

Accordingly, while FIG. 4 only illustrates the a single turn of a virtual assistant by the first entity, the first entity could initiate turns of multiple virtual assistants by sending a second message including second message content for a second virtual assistant to process, receiving a second reply to the second message from the second virtual assistant, and potentially using the first reply and the second reply in furtherance of a process or task being performed by the first entity.

In some embodiments, multiple tools can be accessed in parallel, providing enhanced functionality and flexibility. This system includes both tools hosted by the virtual assistant provider, such as a code interpreter that executes code snippets, and a file search tool for retrieving information from stored files, and tools that are custom-built or externally-hosted tools via function calling, enabling users to dynamically expand the assistant's capabilities.

The virtual assistant system supports real-time data processing and streaming, permitting immediate feedback and continuous data flow.

In some embodiments the virtual assistant can provide configurations to adjust how the virtual assistant handles images. For example, a parameter for detail setting empowers users to adjust the level of detail in image processing, selecting between low, high, or automatic detail based on task requirements.

In some embodiments, first entities can utilizes APIs to control token usage through parameters like max prompt tokens, which limit the number of tokens in the input, and max completion tokens, which limit tokens in the output response, optimizing resource use and ensuring compact responses.

In some embodiments, responses are capable of including annotations for further context or clarification, thus improving information delivery. The system also provides file citations, ensuring accurate reference to uploaded content. The virtual assistant can also supply file paths for any files created by an code interpreter, facilitating user access and retrieval of newly generated content.

FIG. 5 illustrates a logical layout of logical objects relevant to a virtual assistant in accordance with some embodiments of the present technology.

As described herein, virtual assistant 216 is a particular virtual assistant including its configurations.

Conversation thread 502 is conversation session between virtual assistant 216 and a first entity. Conversation threads store message and automatically handle truncation to fit content into a model's context. As addressed herein, a conversation thread is a separate entity from a virtual assistant. One or more virtual assistants can interact with the same thread. And a virtual assistant could interact with multiple threads.

Turn 504 is an invocation of a virtual assistant 216 on a conversation thread 502. Virtual assistant 216 uses its configuration and the message on conversation thread 502 to perform tasks by calling models and tools. As part of a turn 504, virtual assistant 216 appends messages to conversation thread 502.

Figure 6:
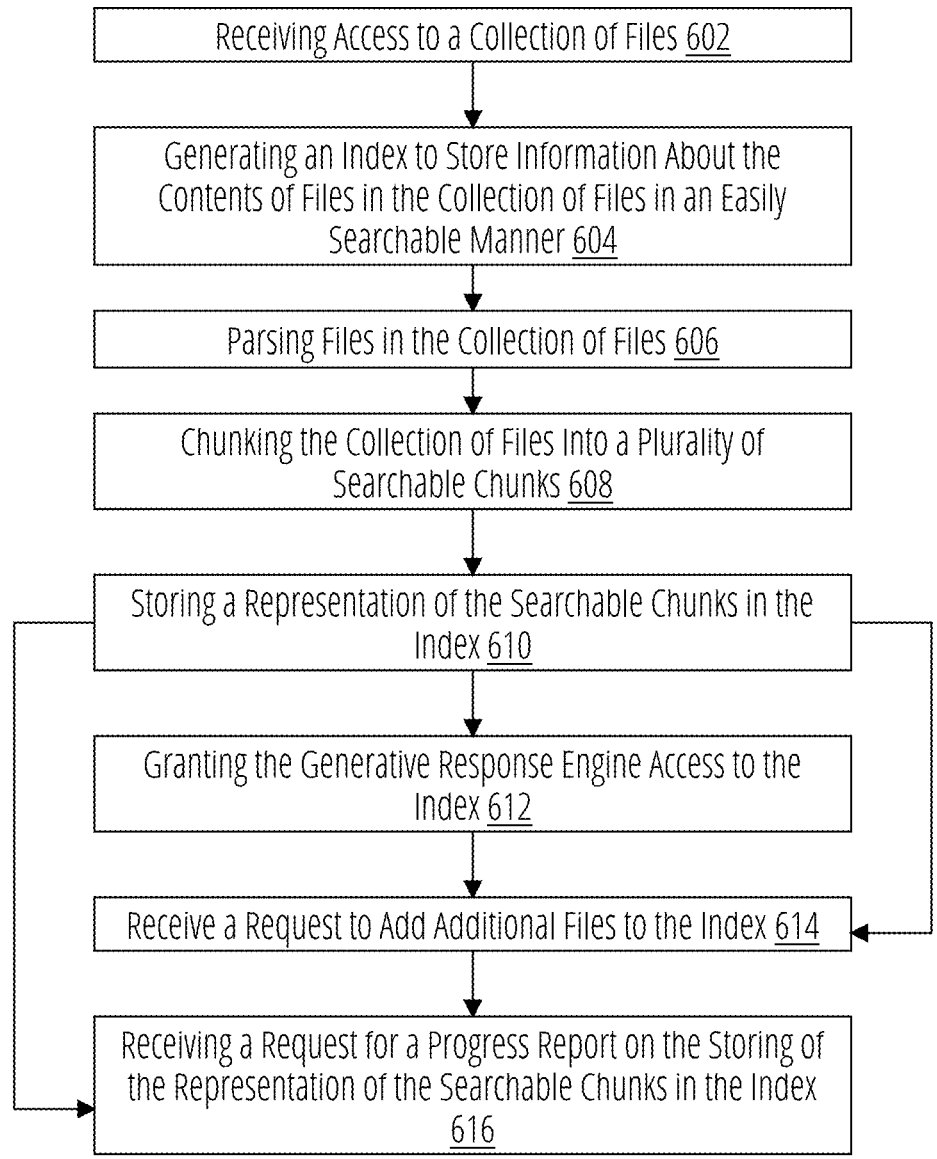
FIG. 6 illustrates an example method for creating an index of files in a collection of files provided by a first entity so that a generative response engine can retrieve information from the collection of files in accordance with some embodiments of the present technology

FIG. 6 illustrates an example method for creating an index of files in a collection of files provided by a first entity so that a generative response engine can retrieve information from the collection of files in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

A virtual assistant can have access to various tools. For example, the virtual assistant can have access to a code interpreter tool, function tool, internet search tool, file search tool, etc. FIG. 6 pertains to creating an index to enable the file search tool.

While some AI tools can read a document or a few documents, such AI tools can quickly exceed their context window when trying to read multiple documents in a collection of documents. Therefore, tools, such as a generative response engine or virtual assistant could benefit from access to an easily searchable index. Moreover, even if an easily searchable index were present, it is still a challenge to have a generative response engine access the index. Accordingly, the present technology includes an API that can be used to create an index from a collection of files and give the generative response engine access to the index. The generative response engine can be trained to determine when it should search the index, and can be trained to determine when it should access an entire document based on search results.

According to some examples, the method includes receiving access to a collection of files at block 602. For example, the file search tool 132 illustrated in FIG. 1 may receive access to a collection of files. Access to the collection of files can be received through an API call. The API call can trigger a workload to generate an index, chunk the collection of files, and store the representation of the searchable chunks in the index, as addressed herein. In some embodiments, the access to the collection of files can be provided in a communication including a prompt that requests the generative response engine to generate a response based on a collection of files.

The file search tool is designed to enable efficient search and retrieval operations. Documents are parsed into text, divided into manageable chunks, embedded into a vector store, and indexed to facilitate precise search capabilities. The generative response engine can access this index to provide contextually relevant responses. In some embodiments, steps starting with receiving a prompt and the collection of files, to completing an index of the collection of files, to accessing the index and providing a response can be handled in an end-to-end process via an API call without further first entity involvement. Though further involvement can occur to adjust configurations, ask further questions, provide more documents to the index, etc.

In some embodiments, a user can customize parameters, such as parameters to adjust chunk size and overlap to allow for optimization based on specific use cases. A parameter is received to adjust a chunk size from the default to a custom size. The maximum size of the searchable chunk is the custom chunk size. A parameter is also received to adjust a chunk overlap from a default overlap size to a custom overlap size. A searchable chunk will overlap with a previous chunk by the custom overlap size.

According to some examples, the method includes generating an index to store information about the contents of files in the collection of files in an easily searchable manner at block 604. For example, the file search tool 132 illustrated in FIG. 1 may generate an index to store information about the contents of files in the collection of files in an easily searchable manner. In some embodiments, the index is given an index identifier so that it can be easily identified by a virtual assistant and so that permission relationships between a virtual assistant and an index can be conveniently mapped and referenced.

In some embodiments, the index is a vector store, which can represent chunks of files, or the whole file, as vectors that embed the meaning of chunks as separate vectors.

According to some examples, the method includes parsing files in the collection of files at block 606. For example, the file search tool 132 can receive files of a large variety of formats, and these files need to be parsed to find text within the files. In some embodiments, some files might not contain text and instead be audio, visual, or audio-visual files. In such embodiments, parsing the files might involve a process of creating a description of the visuals or a transcript or summary of the text in an audio channel. The result of the parsing of the files is text-only output associated with the files.

According to some examples, the method includes chunking the collection of files into a plurality of searchable chunks at block 608. For example, the file search tool 132 illustrated in FIG. 1 may chunk the collection of files into a plurality of searchable chunks. In some embodiments, consecutive chunks can overlap. For example, a default chunk size can be 900 tokens with a 400 token overlap with the previous chunk. As addressed above the chunk size and overlap can be customized by the first entity.

According to some examples, the method includes storing a representation of the searchable chunks in the index at block 610. For example, the file search tool 132 illustrated in FIG. 1 may store a representation of the searchable chunks in the index. In some embodiments, the chunks are embedded into vectors stored in the index, e.g., a vector store.

The process of breaking files into chunks, creating the vectors, and storing the vectors in index can take some time, and is generally an asynchronous process. While multiple files can be processed at the same time, the process can still require some significant duration. Thus, the first entity creating the index will likely want updates on the progress of creating the index. In some embodiments, the system can support real-time updates, allowing progress reports to be sent to the first entity. In some embodiments, the first entity might need to poll the system for updates on the progress of the job to populate the index with the files as addressed at block 616.

In some embodiments, additional files can be added to the index after it has been created by sending instructions to add the files and referencing the index identifier as addressed below at block 614.

According to some examples, the method includes granting the generative response engine or virtual assistant access to the index at block 612. For example, the file search tool 132 illustrated in FIG. 1 may grant the generative response engine access to the index. Thereby, the generative response engine is configured to search the index during inference operations to retrieve information from the searchable chunks when generating a response to a prompt.

According to some examples, the method includes receiving a request to add additional files to the index at block 614. For example, the file search tool 132 illustrated in FIG. 1 may receive a request to add additional files to the index. The request identifies the additional files and the index identifier.

According to some examples, the method includes receiving a request for a progress report on the storing of the representation of the searchable chunks in the index at block 616. For example, the file search tool 132 illustrated in FIG. 1 may receive a request for a progress report on the storing of the representation of the searchable chunks in the index.

Figure 7:
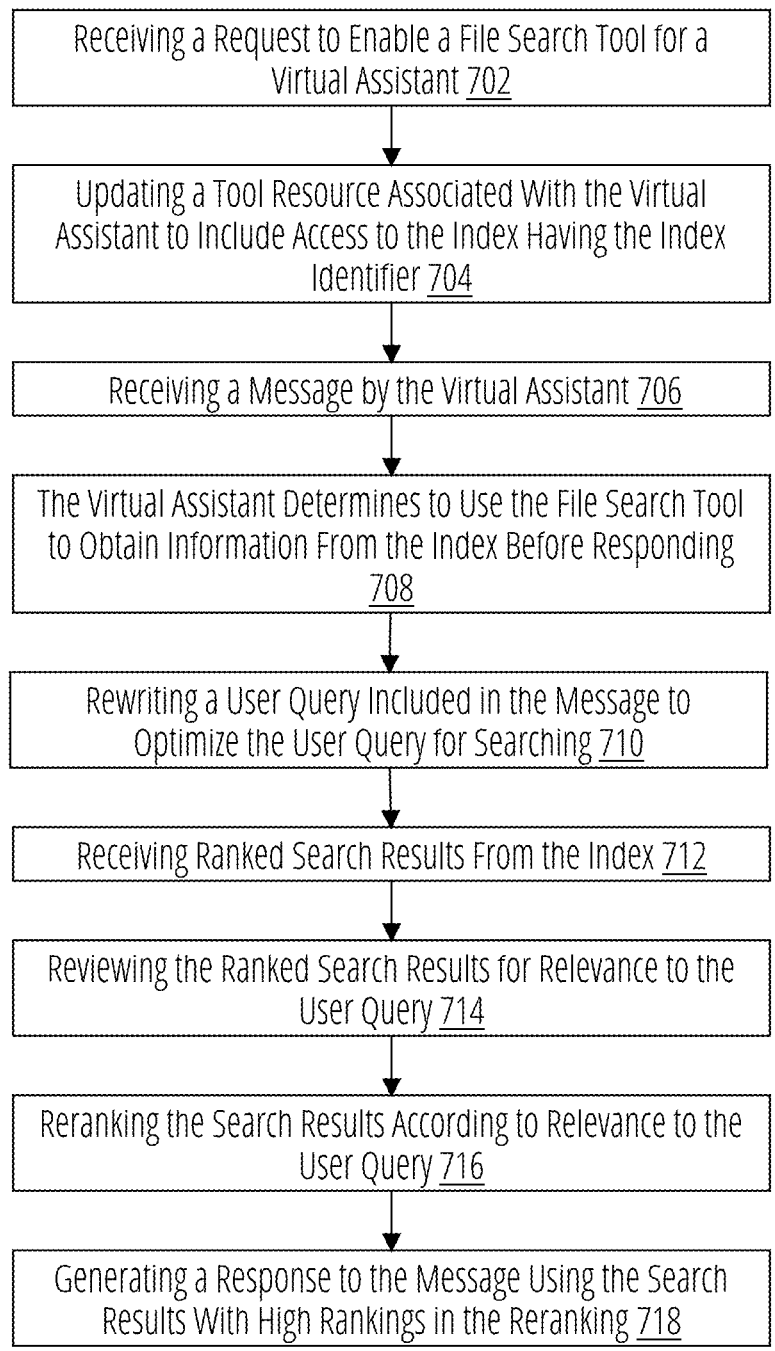
FIG. 7 illustrates an example method for using the file search tool with a virtual assistant in accordance with some embodiments of the present technology.

FIG. 7 illustrates an example method for using the file search tool with a virtual assistant in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some examples, the method includes receiving a request to enable a file search tool for a virtual assistant at block 702. For example, the front end 102 illustrated in FIG. 1 may receive a request to enable a file search tool for a virtual assistant. The request to enable file search can be the communication that causes the system to gain access to the files at block 602 or block 612.

According to some examples, the method includes updating a tool resource associated with the virtual assistant to include access to the index having the index identifier at block 704. For example, the assistant service 150 illustrated in FIG. 1 may update a tool resource associated with the virtual assistant to include access to the index having the index identifier.

According to some examples, the method includes receiving a message to the virtual assistant at block 706. For example, the front end 102 illustrated in FIG. 1 may receive a message to the virtual assistant.

According to some examples, the method includes the virtual assistant determining to use the file search tool to obtain information from the index before responding at block 708. For example, the virtual assistant 216 illustrated in FIG. 2 may determine to use the file search tool to obtain information from the index before responding. The virtual assistant can be trained to determine when it is appropriate to obtain information from the index. Additionally, sometimes, the most relevant search results from the index don't provide enough context to generate a quality answer. Accordingly, the virtual assistant can be trained to determine when to access a computer document and review the document, beyond the relevant chunks returned by the file search tool.

According to some examples, the method includes rewriting a user query included in the message to optimize the user query for searching at block 710. For example, the virtual assistant 216 illustrated in FIG. 2 may rewrite a user query included in the message to optimize the user query for searching. The assistant may rewrite the user's query to optimize it for searching, either by rewording or creating multiple search queries. Search results can be ranked and reviewed for relevance and may be reranked based on user-defined parameters, such as a score threshold for relevance.

According to some examples, the method includes receiving ranked search results from the index at block 712. For example, the virtual assistant 216 illustrated in FIG. 2 may receive ranked search results from the index. In some embodiments, a reranking parameter can be received to change the default ranking setting. The reranking parameter sets a score threshold for a chunk to be considered relevant.

According to some examples, the method includes reviewing the ranked search results for relevance to the user query at block 714. For example, the virtual assistant 216 illustrated in FIG. 2 may review the ranked search results for relevance to the user query.

According to some examples, the method includes reranking the search results according to relevance to the user query at block 716. For example, the virtual assistant 216 illustrated in FIG. 2 may rerank the search results according to relevance to the user query.

According to some examples, the method includes generating a response to the message using the search results with high rankings in the reranking at block 718. For example, the virtual assistant 216 illustrated in FIG. 2 may generate a response to the message using the search results with high rankings in the reranking. In some embodiments, the response to the message includes citations pointing to chunks used to generate the response.

In some embodiments, a first entity can request to see what chunks were returned to the virtual assistant at block 712, and can see what chunks were ultimately used to generate a response to a query. The first entity might use this feature to optimize their files for better chunking, or to adjust chunking parameters, in order to get better retrieval results. Or the first entity might adjust the instructions of the virtual assistant or the ranking parameters used by the virtual assistant at block 716.

Figure 8:
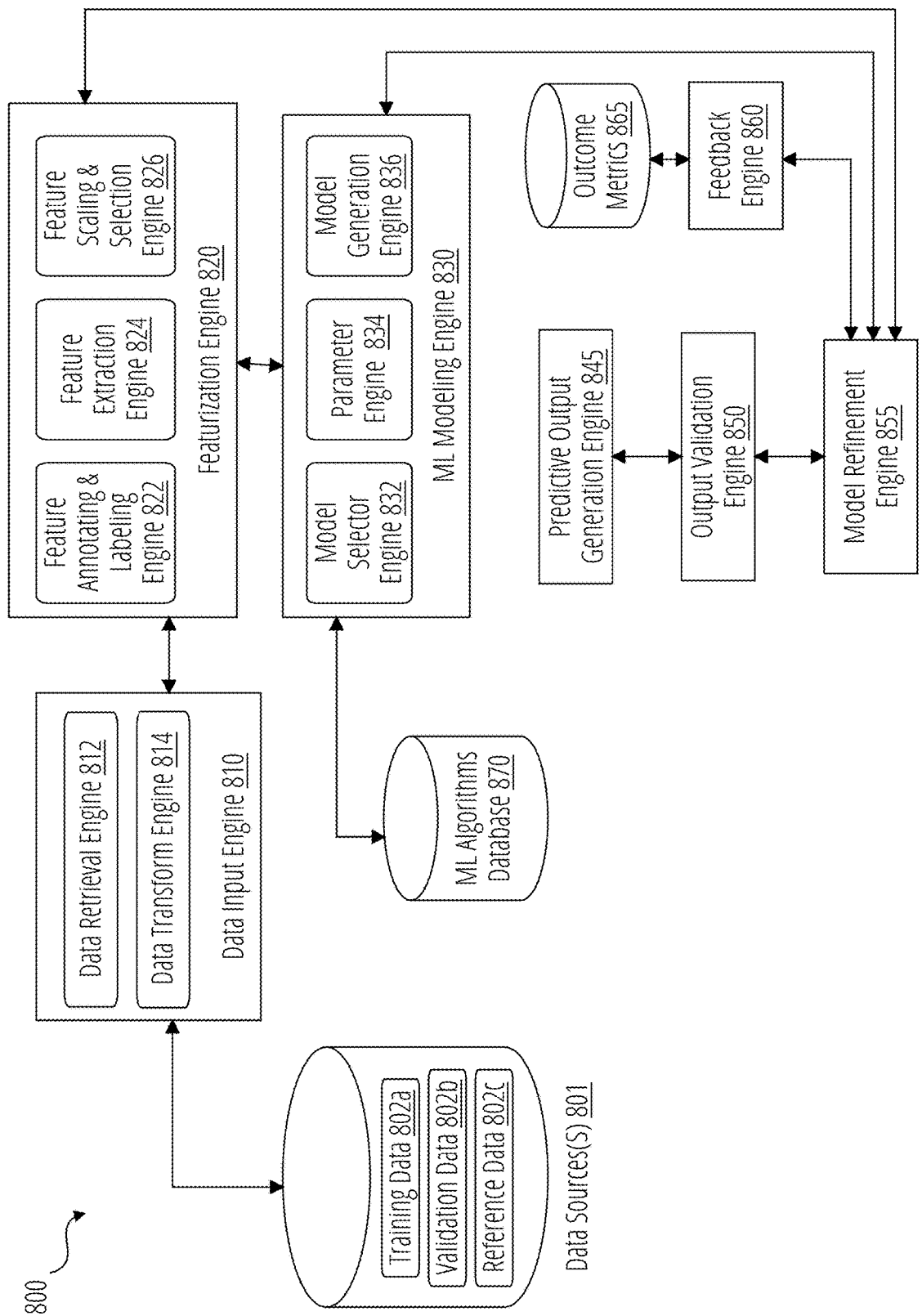
FIG. 8 is a block diagram illustrating an example machine-learning platform for implementing various aspects of this disclosure in accordance with some embodiments of the present technology.

FIG. 8 is a block diagram illustrating an example machine learning platform for implementing various aspects of this disclosure in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

System 800 may include data input engine 810 that can further include data retrieval engine 812 and data transform engine 814. Data retrieval engine 812 may be configured to access, interpret, request, or receive data, which may be adjusted, reformatted, or changed (e.g., to be interpretable by another engine, such as data input engine 810). For example, data retrieval engine 812 may request data from a remote source using an API. Data input engine 810 may be configured to access, interpret, request, format, re-format, or receive input data from data sources(s) 801. For example, data input engine 810 may be configured to use data transform engine 814 to execute a re-configuration or other change to data, such as a data dimension reduction. In some embodiments, data sources(s) 801 may be associated with a single entity (e.g., organization) or with multiple entities. Data sources(s) 801 may include one or more of training data 802*a* (e.g., input data to feed a machine learning model as part of one or more training processes), validation data 802*b* (e.g., data against which at least one processor may compare model output with, such as to determine model output quality), and/or reference data 802*c*. In some embodiments, data input engine 810 can be implemented using at least one computing device. For example, data from data sources(s) 801 can be obtained through one or more I/O devices and/or network interfaces. Further, the data may be stored (e.g., during execution of one or more operations) in a suitable storage or system memory. Data input engine 810 may also be configured to interact with a data storage, which may be implemented on a computing device that stores data in storage or system memory.

System 800 may include featurization engine 820. Featurization engine 820 may include feature annotating & labeling engine 822 (e.g., configured to annotate or label features from a model or data, which may be extracted by feature extraction engine 824), feature extraction engine 824 (e.g., configured to extract one or more features from a model or data), and/or feature scaling & selection engine 826 Feature scaling & selection engine 826 may be configured to determine, select, limit, constrain, concatenate, or define features (e.g., AI features) for use with AI models.

System 800 may also include machine learning (ML) ML modeling engine 830, which may be configured to execute one or more operations on a machine learning model (e.g., model training, model re-configuration, model validation, model testing), such as those described in the processes described herein. For example, ML modeling engine 830 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 802*a*) through a machine learning model process (e.g., a training process). In some embodiments, different epochs may have different degrees of supervision (e.g., supervised, semi-supervised, or unsupervised). Data into a model to train the model may include input data (e.g., as described above) and/or data previously output from a model (e.g., forming a recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, billions, or even trillions of model parameters. ML modeling engine 830 may include model selector engine 832 (e.g., configured to select a model from among a plurality of models, such as based on input data), parameter engine 834 (e.g., configured to add, remove, and/or change one or more parameters of a model), and/or model generation engine 836 (e.g., configured to generate one or more machine learning models, such as according to model input data, model output data, comparison data, and/or validation data).

In some embodiments, model selector engine 832 may be configured to receive input and/or transmit output to ML algorithms database 870. Similarly, featurization engine 820 can utilize storage or system memory for storing data and can utilize one or more I/O devices or network interfaces for transmitting or receiving data. ML algorithms database 870 may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a diffusion model, a diffusion-transformer model, an encoder such as BERT (Bidirectional Encoder Representations from Transformers) or LXMERT (Learning Cross-Modality Encoder Representations from Transformers), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein. Some of the ML algorithms in ML algorithms database 870 can be considered generative response engines. Generative response engines are those models are commonly referred to as Generative AI, and that can receive an input prompt and generate additional content based on the prompt. GPTs, diffusion models, and diffusion-transformer models are some non-limiting examples of generative response engines. Some specific examples of generative response engines that can be stored in the ML algorithms database 870 include versions DALL.E, CHAT GPT, and SORA, all provided by OPEN AI.

System 800 can further include predictive output generation engine 845 and output validation engine 850 (e.g., configured to apply validation data to machine learning model output). Predictive output generation engine 845 can analyze the input and identify relevant patterns and associations in the data it has learned to generate a sequence of words that predictive output generation engine 845 predicts is the most likely continuation of the input using one or more models from the ML algorithms database 870, aiming to provide a coherent and contextually relevant answer. Predictive output generation engine 845 generates responses by sampling from the probability distribution of possible words and sequences, guided by the patterns observed during its training. In some embodiments, predictive output generation engine 845 can generate multiple possible responses before presenting the final one. Predictive output generation engine 845 can generate multiple responses based on the input, and these responses are variations that predictive output generation engine 845 considers potentially relevant and coherent. Output validation engine 850 can evaluate these generated responses based on certain criteria. These criteria can include relevance to the prompt, coherence, fluency, and sometimes adherence to specific guidelines or rules, depending on the application. Based on this evaluation, output validation engine 850 selects the most appropriate response. This selection is typically the one that scores highest on the set criteria, balancing factors like relevance, informativeness, and coherence.

System 800 can further include feedback engine 860 (e.g., configured to apply feedback from a user and/or machine to a model) and model refinement engine 855 (e.g., configured to update or re-configure a model). In some embodiments, feedback engine 860 may receive input and/or transmit output (e.g., output from a trained, partially trained, or untrained model) to outcome metrics database 865. Outcome metrics database 865 may be configured to store output from one or more models and may also be configured to associate output with one or more models. In some embodiments, outcome metrics database 865, or other device (e.g., model refinement engine 855 or feedback engine 860), may be configured to correlate output, detect trends in output data, and/or infer a change to input or model parameters to cause a particular model output or type of model output. In some embodiments, model refinement engine 855 may receive output from predictive output generation engine 845 or output validation engine 850. In some embodiments, model refinement engine 855 may transmit the received output to featurization engine 820 or ML modeling engine 830 in one or more iterative cycles.

The engines of system 800 may be packaged functional hardware units designed for use with other components or a part of a program that performs a particular function (e.g., of related functions). Any or each of these modules may be implemented using a computing device. In some embodiments, the functionality of system 800 may be split across multiple computing devices to allow for distributed processing of the data, which may improve output speed and reduce computational load on individual devices. In some embodiments, system 800 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 800 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

Figure 9A:
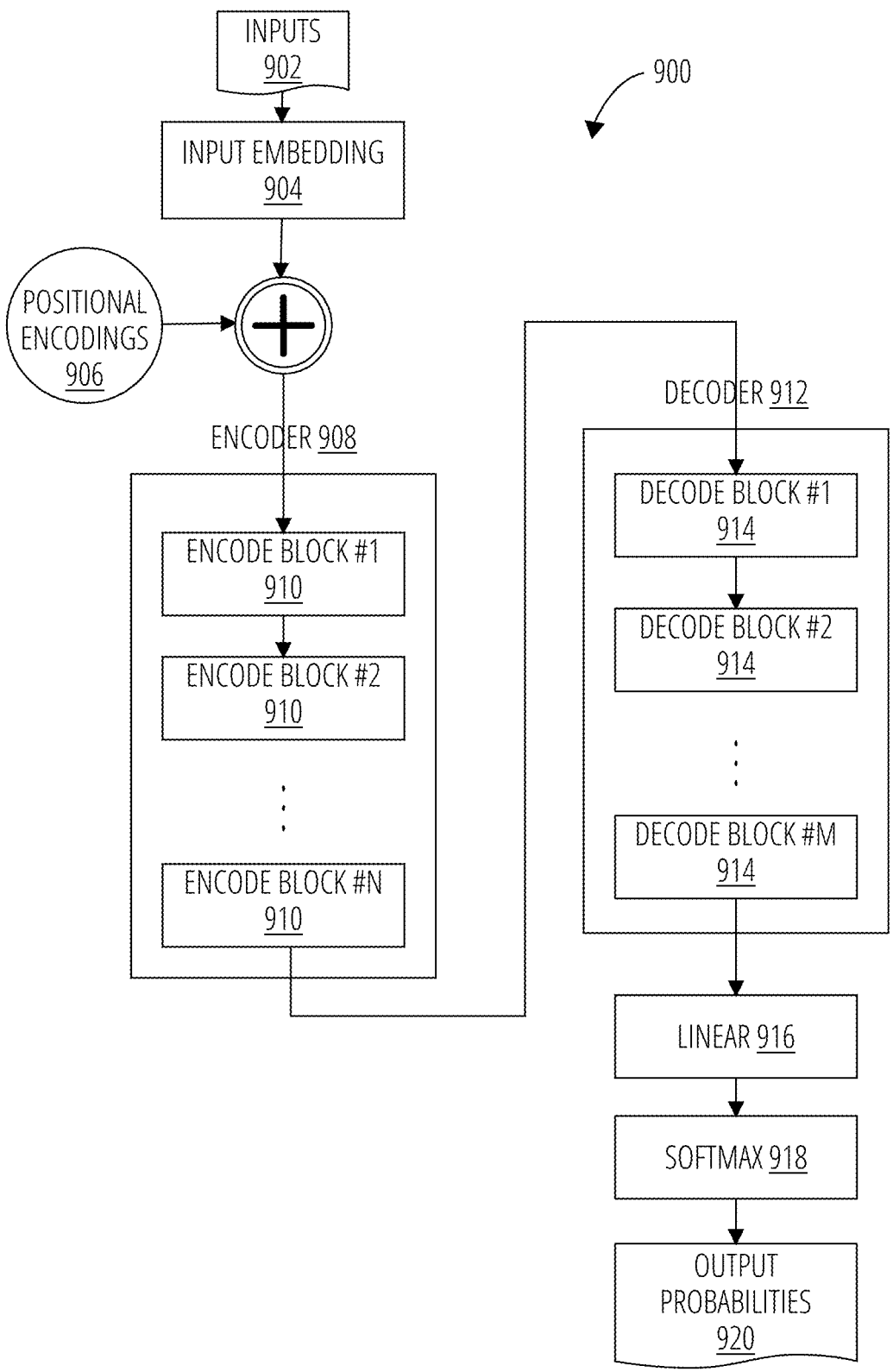
FIG. 9A, FIG. 9B, and FIG. 9C illustrates an example transformer architecture in accordance with some embodiments of the present technology.
Figure 9B:
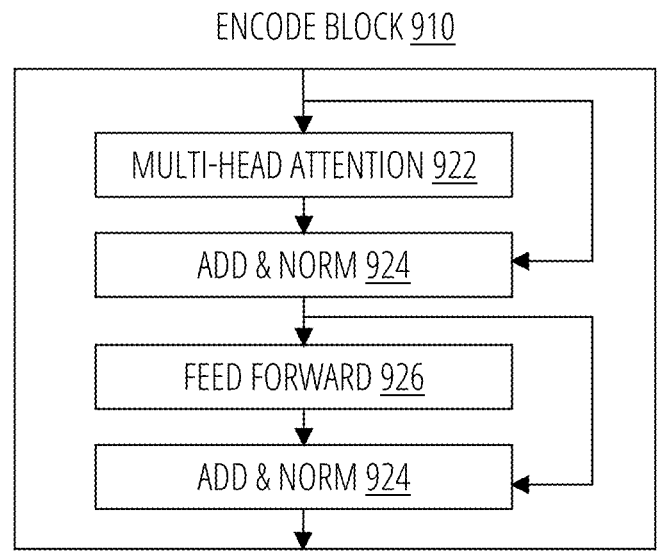
Figure 9C:
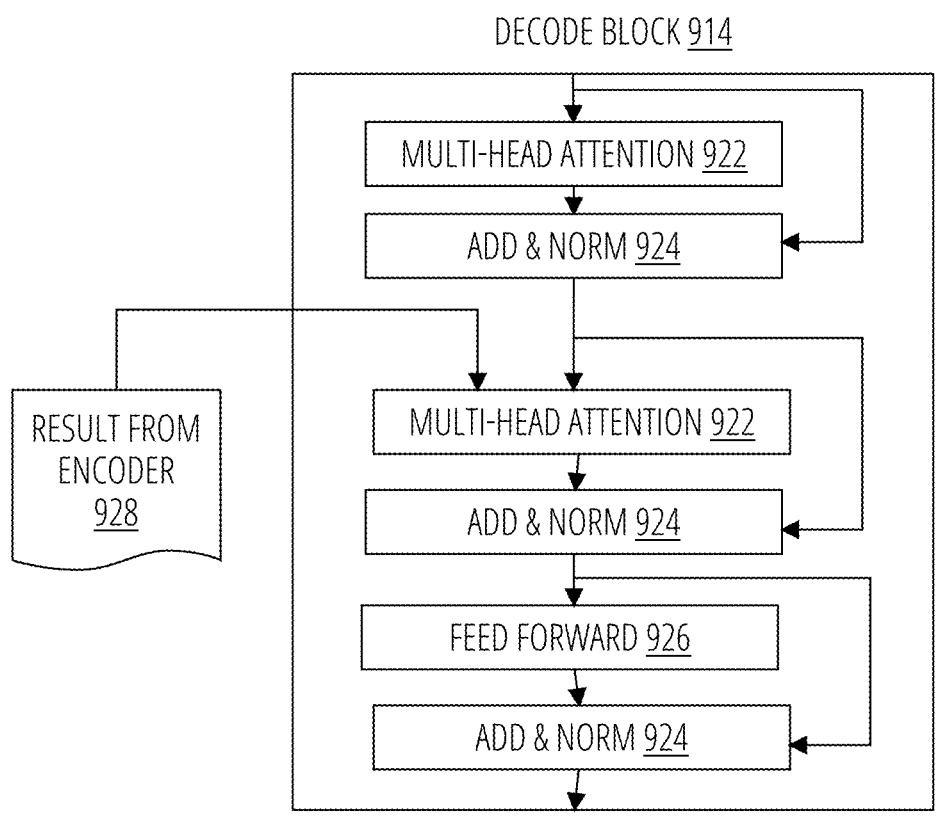

FIG. 9A, FIG. 9B, and FIG. 9C illustrates an example transformer architecture in accordance with some embodiments of the present technology. Examples of ML models that use a transformer neural network (e.g., transformer architecture 900) can include, e.g., generative pretrained transformer (GPT) models and Bidirectional Encoder Representations from Transformer (BERT) models. The transformer architecture 900, which is illustrated in FIG. 9A, FIG. 9B, and FIG. 9C, includes inputs 902, input embedding block 904, positional encodings 906, encoder 908 including encode blocks 910, decoder 912 including decode blocks 914, linear block 916, softmax block 918, and output probabilities 920.

Input embedding block 904 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 904 can be learned embeddings to convert the input tokens and output tokens to vectors of dimension that have the same dimension as the positional encodings, for example.

Positional encodings 906 provide information about the relative or absolute position of the tokens in the sequence. According to certain non-limiting examples, positional encodings 906 can be provided by adding positional encodings to the input embeddings at the inputs to the encoder 908 and decoder 912. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that doing so allows the model to extrapolate to sequence lengths longer than the ones encountered during training.

Encoder 908 can use stacked self-attention and point-wise, fully connected layers. Encoder 908 can be a stack of N identical layers (e.g., N=6), and each layer can be an encode block, as illustrated by encode block 910 shown in FIG. 9B. Each encode block 910 has two sub-layers: (i) a first sub-layer has a multi-head attention block 922 and (ii) a second sub-layer has a feed forward block 926, which can be a position-wise fully connected feed-forward network. The feed forward block 926 can use a rectified linear unit (ReLU).

Encoder 908 uses a residual connection around each of the two sub-layers, followed by an add & norm block 924, which performs normalization. For example, the output of each sub-layer can be LayerNorm(x+Sublayer(x)). To facilitate these residual connections, all sub-layers in the model, as well as the embedding layers, produce output data having a same dimension.

Similar to encoder 908, decoder 912 uses stacked self-attention and point-wise, fully connected layers. Decoder 912 can also be a stack of M identical layers (e.g., M=6), and each layer can be a decode block, as illustrated by decode block 912 shown in FIG. 9B. In addition to the two sub-layers (i.e., the sublayer with multi-head attention block 922 and the sub-layer with feed forward block 926) found in encode block 910, decode block 914 can include a third sub-layer, which performs multi-head attention over the output of the encoder stack. Similar to encoder 908, decoder 912 uses residual connections around each of the sub-layers, followed by layer normalization. Additionally, the sub-layer with multi-head attention block 922 can be modified in the decoder stack to prevent positions from attending to subsequent positions. This masking, combined with the fact that the output embeddings are offset by one position, can ensure that the predictions for position i can depend only on the known output data at positions less than i.

Linear block 916 can be a learned linear transformation. For example, when transformer architecture 900 is being used to translate from a first language into a second language, linear block 916 can project the output from the last decode softmax block 918 into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

Softmax block 918 then turns the scores from linear block 916 into output probabilities 920 (which add up to 1.0). In each position, the index provides for the word with the highest probability, and then maps that index to the corresponding word in the vocabulary. Those words then form the output sequence of transformer architecture 900. The softmax operation is applied to the output from linear block 916 to convert the raw numbers into output probabilities 920 (e.g., token probabilities).

Figure 10:
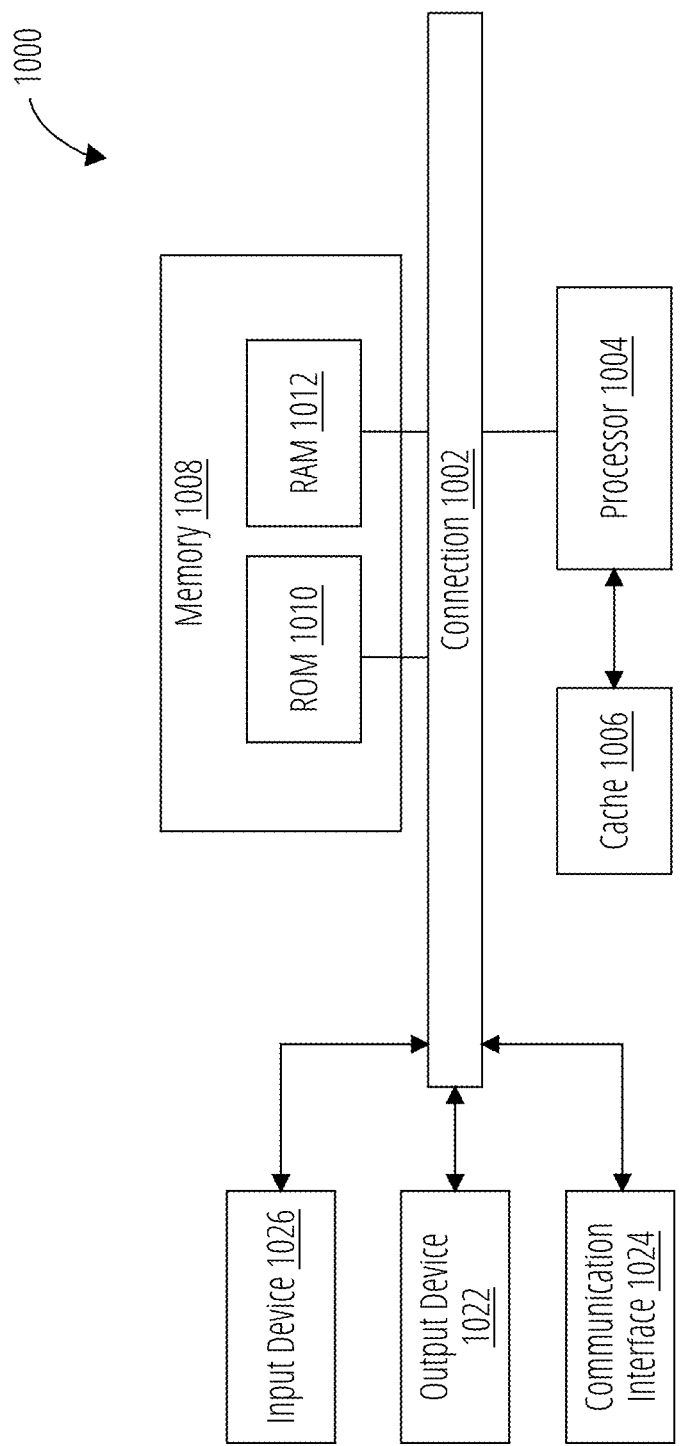
FIG. 10 shows an example of a system for implementing some embodiments of the present technology.

FIG. 10 shows an example of computing system 1000, which can be, For example, any computing device making up any engine illustrated in FIG. 1 or FIG. 2 or any component thereof.

In some embodiments, computing system 1000 is a single device, or a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

In some embodiments, computing system 1000 may comprise one or more computing resources provisioned from a "cloud computing" provider, For example, AMAZON ELASTIC COMPUTE CLOUD ("AMAZON EC2"), provided by AMAZON, INC. of Seattle, Washington; SUN CLOUD COMPUTER UTILITY, provided by SUN MICROSYSTEMS, INC. of Santa Clara, California; AZURE, provided by MICROSOFT CORPORATION of Redmond, Washington, GOOGLE CLOUD PLATFORM, provided by ALPHABET, INC. of Mountain View, California, and the like.

Example computing system 1000 includes at least one processing unit (CPU or processor) 1004 and connection 1002 that couples various system components including system memory 1008, such as read-only memory (ROM) 1010 and random access memory (RAM) 1012 to processor 1004. Memory 1008 can be a volatile or non-volatile memory device, and can be a hard disk or other types of non-transitory computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

Memory 1008 can include software services, servers, logic, etc., that when the code that defines such software is executed by the processor 1004, it causes the system to perform a function. In some embodiments, a hardware service that performs a particular function can include the software component stored in a computer-readable medium in connection with the necessary hardware components, such as processor 1004, connection 1002, output device 1022, etc., to carry out the function.

Computing system 1000 can include a cache of high-speed memory 1006 connected directly with, in close proximity to, or integrated as part of processor 1004.

Connection 1002 can be a physical connection via a bus, or a direct connection into processor 1004, such as in a chipset architecture. Connection 1002 can also be a virtual connection, networked connection, or logical connection.

Processor 1004 can include any general purpose processor and a hardware service or software service stored in memory 1008, configured to control processor 1004 as well as a special-purpose processor where software instructions are incorporated into the actual processor design. Processor 1004 may essentially be a completely self-contained computing system, containing multiple cores or processors, a bus, memory controller, cache, etc. A multi-core processor may be symmetric or asymmetric. Processor 1004 can be physical or virtual.

To enable user interaction, computing system 1000 includes an input device 1026, which can represent any number of input mechanisms, such as a microphone for speech, a touch-sensitive screen for gesture or graphical input, keyboard, mouse, motion input, speech, etc. Computing system 1000 can also include output device 1022, which can be one or more of a number of output mechanisms known to those of skill in the art. In some instances, multimodal systems can enable a user to provide multiple types of input/output to communicate with computing system 1000. Computing system 1000 can include communication interface 1024, which can generally govern and manage the user input and system output. There is no restriction on operating on any particular hardware arrangement, and therefore the basic features here may easily be substituted for improved hardware or firmware arrangements as they are developed.

In some embodiments, computing system 1000 can refer to a combination of a personal computing device interacting with components hosted in a data center, where both the computing device and the components in the data center. In such examples, both the personal computing device and the components in the datacenter might have a processor, cache, memory, storage, etc.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, For example, instructions and data which cause or otherwise configure a general purpose computer, special purpose computer, or special purpose processing device to perform a certain function or group of functions. Portions of computer resources used can be accessible over a network. The executable computer instructions may be, For example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspects

The present technology includes computer-readable storage mediums for storing instructions, and systems for executing any one of the methods embodied in the instructions addressed in the aspects of the present technology presented below:

Aspect 1: A method of operating a generative response engine as an assistant, the method comprising: receiving a request to access a virtual assistant from a first entity, the request to access the virtual assistant identifies the virtual assistant by its assistant ID, wherein the virtual assistant is a generative response engine that is adapted to exhibit customized behaviors during inference operations, the customized behaviors are defined in configurations for the virtual assistant; in response to receiving the request to access the virtual assistant, loading the configurations for the virtual assistant into a memory of a processing unit; receiving a message, wherein the message includes message content for the virtual assistant to process, wherein the message is accompanied by a thread ID that identifies a conversation thread to which the message should be posted; in response to receiving the message, providing a reply that is the result of processing performed by the virtual assistant, the processing being informed by the configurations for the virtual assistant and the message content, wherein the reply is provided to the conversation thread identified by the thread ID; and sending the conversation thread including the reply to the first entity, wherein the first entity has a real-time connection to receive updates to the thread, wherein the first entity periodically requests updates to the thread to trigger the sending of the updated thread.

Aspect 2: The method of aspect 1, further comprising: receiving a request to create the virtual assistant, wherein the request includes instructions that, at least in part, define customized behaviors for the virtual assistant; in response to the request to create the virtual assistant, return the assistant ID.

Aspect 3: The method of any one of aspects 1-2, further comprising: in response to the request to create the virtual assistant, storing the instructions in association with the assistant ID as the configurations for the virtual assistant that are retrievable when the virtual assistant is requested by reference to the assistant ID.

Aspect 4: The method of any one of aspects 1-3, wherein the request to create the virtual assistant or a request to modify the virtual assistant includes instructions to enable at least one tool for use by the virtual assistant, wherein the at least one tool is a code interpreter tool, a function tool, or a file search tool, wherein the at least one tool enabled for use by the virtual assistant is stored as part of the configurations for the virtual assistant.

Aspect 5: The method of any one of aspects 1-4, wherein the request to create the virtual assistant or a request to modify the virtual assistant includes instructions to limit a number of input tokens that can be provided to the virtual assistant in a turn, and/or instructions to limit a number of output tokens that the virtual assistant can output in the response to the request in the turn, wherein the limit to the number of input tokens or output tokens is stored as part of the configurations for the virtual assistant, wherein a turn includes the prompt and the response, and further prompt and response iterations are further turns.

Aspect 6: The method of any one of aspects 1-5, wherein the receiving the message for the virtual assistant to process is received via an application programming interface (API).

Aspect 7: The method of any one of aspects 1-6, wherein the API has enabled streaming responses, whereby the response from the virtual assistant is streamed to the first entity as it is generated.

Aspect 8: The method of any one of aspects 1-7, wherein the message for the virtual assistant to process is accompanied by an identification of a tool that the virtual assistant should use when processing the message, wherein the tool is a code interpreter tool, a function tool, or a file search tool, wherein the virtual assistant is configured to use any of the code interpreter tool, the function tool, or the file search tool but uses the identified tool.

Aspect 9: The method of any one of aspects 1-8, wherein the request to create the virtual assistant or a request to modify the virtual assistant includes instructions identifying a particular generative response engine to be used by the generative response engine, wherein the particular generative response engine is a custom fine-tuned version of the generative response engine, wherein the custom fine-tuned version of the generative response engine includes the generative response engine and a LoRA adapter which customizes the generative response engine.

Aspect 10: A method of using a virtual assistant, further comprising: sending a message including message content for a virtual assistant to process, wherein the virtual assistant is associated with configurations for the virtual assistant that customize the behaviors of the virtual assistant, wherein the message is accompanied by a thread ID that identifies a conversation thread to which the message should be posted; receiving a reply to the message from the virtual assistant, the reply is the result of processing performed by the virtual assistant in accordance with the configurations for the virtual assistant and the message content, wherein the reply is included in the conversation thread identified by the thread ID.

Aspect 11: The method of aspect 10, further comprising: sending a second message including second message content for a second virtual assistant to process; receiving a second reply to the second message from the second virtual assistant; using the first reply and the second reply in furtherance of a process of a first entity.

Aspect 12: The method of any one of aspects 10-11, the method comprising: prior to or at the same time as the sending the message for the virtual assistant to process, requesting the virtual assistant to be loaded into memory to be ready to process the message content, the virtual assistant is identified by an assistant ID, wherein the virtual assistant is a generative response engine that is adapted to exhibit customized behaviors during inference operations, the customized behaviors are defined in configurations for the virtual assistant.

Aspect 13: The method of any one of aspects 10-12, further comprising: requesting to create the virtual assistant, wherein the request includes instructions that, at least in part, define customized behaviors for the virtual assistant, wherein the virtual assistant is provided by a service accessible via an application programming interface (API); receiving the assistant ID.

Aspect 14: The method of any one of aspects 10-13, wherein the request to create the virtual assistant or a request to modify the virtual assistant includes instructions to enable at least one tool for use by the virtual assistant, wherein the at least one tool is a code interpreter tool, a function tool, or a file search tool, wherein the at least one tool enabled for use by the virtual assistant is stored as part of the configurations for the virtual assistant.

Aspect 15: The method of any one of aspects 10-14, wherein the request to create the virtual assistant or a request to modify the virtual assistant includes instructions to limit a number of input tokens that can be provided to the virtual assistant in a turn, and/or instructions to limit a number of output tokens that the virtual assistant can output in the response to the request in the turn, wherein the limit to the number of input tokens or output tokens is stored as part of the configurations for the virtual assistant, wherein a turn includes the prompt and the response, and further prompt and response iterations are further turns.

Aspect 16: The method of any one of aspects 10-15, wherein the request to create the virtual assistant or a request to modify the virtual assistant includes instructions identifying a particular generative response engine to be used by the generative response engine, wherein the particular generative response engine is a custom fine-tuned version of the generative response engine, wherein the custom fine-tuned version of the generative response engine includes the generative response engine and a LoRA adapter which customizes the generative response engine.

Aspect 17: The method of any one of aspects 10-16, wherein the message for the virtual assistant to process is accompanied by an identification of a tool that the virtual assistant should use when processing the message, wherein the tool is a code interpreter tool, a function tool, or a file search tool, wherein the virtual assistant is configured to use any of the code interpreter tool, the function tool, or the file search tool but uses the identified tool.

Aspect 18: A method of receiving files to be accessed by a file search tool of a generative response engine, the method comprising: receiving access to a collection of files; generating an index to store information about the contents of files in the collection of files in an easily searchable manner, wherein the index is given an index identifier, wherein the index is a vector store; chunking the collection of files into a plurality of searchable chunks, wherein consecutive chunks are overlapping, wherein a default chunk size is 800 tokens with a 900 token overlap with the previous chunk; storing a representation of the searchable chunks in the index, wherein the chunks are embedded into a vector stored in the vector store; granting the generative response engine access to the index, wherein the generative response engine is configured to search the index during inference operations to retrieve information from the searchable chunks when generating a response to a prompt.

Aspect 19: The method of aspect 18, further comprising: receiving a request to enable a file search tool for a virtual assistant; updating a tool resource associated with the virtual assistant to include access to the index having the index identifier.

Aspect 20: The method of any one of aspects 18-19, wherein the access to the collection of files is received through an API call, wherein the API call triggers a workload to generate the index, chunk the collection of files, and store the representation of the searchable chunks in the index.

Aspect 21: The method of any one of aspects 18-20, further comprising: receive a request to add additional files to the index, wherein the request identifies the additional files and the index identifier.

Aspect 22: The method of any one of aspects 18-21, further comprising: receiving a request for a progress report on the storing of the representation of the searchable chunks in the index.

Aspect 23: The method of any one of aspects 18-22, further comprising: receiving a parameter to adjust a chunk from a default chunk size to a custom chunk size; wherein the maximum size of the searchable chunk is the custom chunk size.

Aspect 24: The method of any one of aspects 18-23, further comprising: receiving a parameter to adjust a chunk overlap from a default overlap size to a custom overlap size; wherein a searchable chunk will overlap with a previous chunk by the custom overlap size.

Aspect 25: The method of any one of aspects 18-24, further comprising: receiving a message by the virtual assistant, wherein the virtual assistant determines to use the file search tool to obtain information from the index before responding.

Aspect 26: The method of any one of aspects 18-25, further comprising: rewriting a user query included in the message to optimize the user query for searching, wherein the rewriting the user query includes any of rewording the user query and creating queries for multiple searches.

Aspect 27: The further of any one of aspects 18-26, further comprising: receiving ranked search results from the index; reviewing the ranked search results for relevance to the user query; reranking the search results according to relevance to the user query; generating a response to the message using the search results with high rankings in the reranking.

Aspect 28: The method of any one of aspects 18-27, further comprising: receiving a reranking parameter to change a default ranking setting, wherein the reranking parameter sets a score threshold a chunk to be considered relevant.

Aspect 29: The method of any one of aspects 18-28, wherein the response to the message includes citations pointing to chunks used to generate the response.

Aspect 30: A system comprising a storage including instructions, and at least one processor, wherein the instructions are effective to cause the at least one processor to perform any one of the aspects 1-29.

Aspect 31: A computer-readable medium including instructions stored thereon, the instructions are effective to cause at least one processor to perform any one of the aspects 1-29.

What is claimed is:

1. A method of operating a generative response engine as an assistant, the method comprising:
   receiving a request to access a virtual assistant from a first entity, the request to access the virtual assistant identifies the virtual assistant by its assistant ID;
   in response to receiving the request to access the virtual assistant, loading configurations for the virtual assistant from a configurations database into a memory of a processing unit, wherein the configurations of the virtual assistant include adapter weights associated with the assistant ID and instructions enabling a file search tool;
   loading a conversation thread from a conversation threads database into a context window for the virtual assistant;
   receiving a message to be appended to the conversation thread, wherein the message includes message content for the virtual assistant to process;
   in response to receiving the message, processing by the virtual assistant, the message, the processing being informed by the configurations for the virtual assistant and the message content, wherein the processing causes the virtual assistant to cross a decision boundary to call the file search tool;
   generating a reply to the message based on the message and a result returned from the file search tool; and
   sending the conversation thread including the reply to the first entity.

2. The method of claim 1, wherein the virtual assistant is a generative response engine that is adapted to exhibit customized behaviors during inference operations, the customized behaviors are defined in the configurations for the virtual assistant.

3. The method of claim 1, wherein the message is accompanied by a thread ID that identifies the conversation thread to which the message should be posted and wherein the reply is provided to the conversation thread identified by the thread ID.

4. The method of claim 1, further comprising:
   receiving a request to create the virtual assistant, wherein the request includes instructions that, at least in part, define customized behaviors for the virtual assistant; and
   in response to the request to create the virtual assistant, return the assistant ID.

5. The method of claim 4, further comprising:
   in response to the request to create the virtual assistant, storing the instructions in association with the assistant ID as the configurations for the virtual assistant that are retrievable when the virtual assistant is requested by reference to the assistant ID.

6. The method of claim 4, wherein the request to create the virtual assistant or a request to modify the virtual assistant includes instructions to limit a number of input tokens that can be provided to the virtual assistant in a turn, and/or instructions to limit a number of output tokens that the virtual assistant can output in the response to the request in the turn.

7. The method of claim 4, wherein the request to create the virtual assistant or a request to modify the virtual assistant includes instructions identifying a particular generative response engine to be used by the generative response engine, wherein the particular generative response engine is a custom fine-tuned version of the generative response engine.

8. The method of claim 1, wherein the receiving the message for the virtual assistant to process is received via an application programming interface (API).

9. The method of claim 8, wherein the API has enabled streaming responses, whereby the response from the virtual assistant is streamed to the first entity as it is generated.

10. The method of claim 1, further comprising:
    after crossing the decision boundary to call the file search tool, calling the file search tool by sending a query to a vector store;
    receiving relevant chunks, wherein chunks are portions of files in the vector store;
    reviewing the chunks for relevance and use of relevant chunks to generate the reply to the message.

11. A system comprising:
    at least one processor; and
    at least one memory storing instructions that, when executed by the at least one processor, configure the system to:
    receive a request to access a virtual assistant from a first entity, the request to access the virtual assistant identifies the virtual assistant by its assistant ID;
    in response to receiving the request to access the virtual assistant, load configurations for the virtual assistant from a configurations database into a memory of a processing unit, wherein the configurations of the virtual assistant include adapter weights associated with the assistant ID and instructions enabling a file search tool;
    load a conversation thread from a conversation threads database into a context window for the virtual assistant;
    receive a message to be appended to the conversation thread, wherein the message includes message content for the virtual assistant to process;
    in response to receiving the message, processing the message by the virtual assistant, the processing being informed by the configurations for the virtual assistant and the message content, wherein the processing causes the virtual assistant to cross a decision boundary to call the file search tool;

generate a reply to the message based on the message and a result returned from the file search tool; and send the conversation thread including the reply to the first entity.

12. The computing apparatus of claim 11, wherein the message for the virtual assistant to process is accompanied by an identification of a tool that the virtual assistant should use when processing the message, wherein the tool is the file search tool.

13. A non-transitory computer-readable medium comprising instructions stored thereon that, when executed by at least one processor, configure the at least one processor to:

receive a request to access a virtual assistant from a first entity, the request to access the virtual assistant identifies the virtual assistant by its assistant ID;

in response to receiving the request to access the virtual assistant, load configurations for the virtual assistant from a configurations database into a memory of a processing unit, wherein the configurations of the virtual assistant include adapter weights associated with the assistant ID and instructions enabling a file search tool;

load a conversation thread from a conversation threads database into a context window for the virtual assistant;

receive a message to be appended to the conversation thread, wherein the message includes message content for the virtual assistant to process;

in response to receiving the message, processing the message by the virtual assistant, the processing being informed by the configurations for the virtual assistant and the message content, wherein the processing causes the virtual assistant to cross a decision boundary to call the file search tool;

generate a reply to the message based on the message and a result returned from the file search tool; and send the conversation thread including the reply to the first entity.

14. The non-transitory computer-readable medium of claim 13, wherein the virtual assistant is a generative response engine that is adapted to exhibit customized behaviors during inference operations, the customized behaviors are defined in the configurations for the virtual assistant.

15. The non-transitory computer-readable medium of claim 13, wherein the message is accompanied by a thread ID that identifies the conversation thread to which the message should be posted and wherein the reply is provided to the conversation thread identified by the thread ID.

16. The non-transitory computer-readable medium of claim 13, wherein the at least one processor is further configured to:

receive a request to create the virtual assistant, wherein the request includes instructions that, at least in part, define customized behaviors for the virtual assistant; and in response to the request to create the virtual assistant, return the assistant ID.

17. The non-transitory computer-readable medium of claim 16, wherein the at least one processor is further configured to:

after crossing the decision boundary to call the file search tool, call the file search tool by sending a query to a vector store;

receive relevant chunks, wherein chunks are portions of files in the vector store;

review the chunks for relevance and use of relevant chunks to generate the reply to the message.

18. The non-transitory computer-readable medium of claim 16, wherein the request to create the virtual assistant or a request to modify the virtual assistant includes instructions to limit a number of input tokens that can be provided to the virtual assistant in a turn, and/or instructions to limit a number of output tokens that the virtual assistant can output in the response to the request in the turn.

19. The non-transitory computer-readable medium of claim 16, wherein the request to create the virtual assistant or a request to modify the virtual assistant includes instructions identifying a particular generative response engine to be used by the generative response engine, wherein the particular generative response engine is a custom fine-tuned version of the generative response engine.

20. The non-transitory computer-readable medium of claim 13, wherein the receiving the message for the virtual assistant to process is received via an application programming interface (API), wherein the API has enabled streaming responses, whereby the response from the virtual assistant is streamed to the first entity as it is generated.

* * * * *